(12) United States Patent
Junghans et al.

(10) Patent No.: US 7,584,078 B2
(45) Date of Patent: Sep. 1, 2009

(54) CREATING, DESIGNING, MANAGING, SCHEDULING, DEVELOPING AND PRODUCING PRODUCTS

(75) Inventors: Christine Junghans, Berlin (DE); Sandro Fengler, Berlin (DE); Frank Bunar, Berlin (DE)

(73) Assignee: IAV GmbH Ingenieurgesellschaft Auto und Verker, Berlin (DE)

( * ) Notice: Subject to any disclaimer, the term of this patent is extended or adjusted under 35 U.S.C. 154(b) by 360 days.

(21) Appl. No.: 11/463,561

(22) Filed: Aug. 9, 2006

(65) Prior Publication Data

US 2007/0038893 A1 Feb. 15, 2007

Related U.S. Application Data

(60) Provisional application No. 60/707,484, filed on Aug. 10, 2005.

(51) Int. Cl.
*G06F 17/50* (2006.01)

(52) U.S. Cl. .............................. 703/1; 700/97; 345/440

(58) Field of Classification Search .................. 700/95, 700/97, 98, 182; 703/1, 6, 13, 22; 345/418–420, 345/440, 440.1, 440.2; 717/132, 144, 156; 715/215

See application file for complete search history.

(56) References Cited

U.S. PATENT DOCUMENTS

| | | | |
|---|---|---|---|
| 4,875,162 A | 10/1989 | Ferriter et al. | |
| 5,517,420 A * | 5/1996 | Kinsman et al. | ............ 700/166 |
| 5,761,063 A | 6/1998 | Jannette et al. | |
| 5,812,130 A | 9/1998 | Van Huben | |
| 5,826,265 A | 10/1998 | Van Huben | |
| 5,864,875 A | 1/1999 | Van Huben | |
| 5,878,408 A | 3/1999 | Van Huben | |
| 5,920,867 A | 7/1999 | Van Huben | |
| 5,920,873 A | 7/1999 | Van Huben | |
| 5,950,201 A | 9/1999 | Van Huben | |
| 5,996,595 A * | 12/1999 | Olesen et al. | ................ 134/1.3 |
| 6,035,297 A | 3/2000 | Van Huben | |
| 6,036,345 A | 3/2000 | Jannette et al. | |
| 6,088,693 A | 7/2000 | Van Huben | |
| 6,094,654 A | 7/2000 | Van Huben | |
| 6,308,164 B1 | 10/2001 | Nummelin et al. | |
| 6,405,211 B1 | 6/2002 | Sokol | |

(Continued)

OTHER PUBLICATIONS

The PTC Product Development System Brochure, Parametric Development Corporation, Needham, MA, 2004.

(Continued)

*Primary Examiner*—Charles R Kasenge
(74) *Attorney, Agent, or Firm*—SoCal Ip Law Group LLP; Mark A. Goldstein

(57) ABSTRACT

Systems and methods to create, design, manage, schedule, develop and produce products are disclosed. A method may include displaying information about a product during creation, design, development and/or production. The displaying may be achieved by providing a three axis representation of a product including in which a first axis is a representation of a process chain, a second axis is a representation of product structure, and a third axis is a representation of functional elements of the product. The three axes may be augmented with an underlying circle representing relational interfaces. The method may be implemented on one or more server computers, client computers, and/or other computing devices which may communicate over a network.

45 Claims, 17 Drawing Sheets
(15 of 17 Drawing Sheet(s) Filed in Color)

U.S. PATENT DOCUMENTS

| | | | |
|---|---|---|---|
| 6,658,428 | B2 | 12/2003 | Sokol |
| RE38,633 | E | 10/2004 | Srinivasan |
| 6,854,088 | B2 | 2/2005 | Massengale et al. |
| 6,988,014 | B2 | 1/2006 | Kraemer |
| 6,988,060 | B1 * | 1/2006 | Coon et al. ............... 703/13 |
| 7,054,885 | B1 | 5/2006 | Hoffman |
| 7,058,588 | B2 | 6/2006 | Young et al. |
| 7,211,503 | B2 * | 5/2007 | Chen et al ............... 438/597 |
| 2002/0129044 | A1 | 9/2002 | Jeckle |
| 2003/0130749 | A1 | 7/2003 | Haag et al. |
| 2003/0182004 | A1 * | 9/2003 | Linder et al. ............... 700/97 |
| 2004/0138775 | A1 | 7/2004 | Bigelow |
| 2005/0137731 | A1 | 6/2005 | Haag et al. |
| 2005/0222897 | A1 | 10/2005 | Walter |
| 2006/0085088 | A1 * | 4/2006 | Nakayama et al. ........... 700/97 |
| 2006/0090071 | A1 | 4/2006 | Sinzig et al. |

OTHER PUBLICATIONS

Wiedermann, Klaus, BMW Group: Paradigm Shifts in CAx, CAD-CAM, Jan. 2, 2006.

Thoben, K.D. and F. Weber, Formal Interaction Analysis -A Methodology and Software Tool for the Design and Assessment of Information and Communication Structures for Concurrent Engineering, Proceedings of the 1st International Symposium on Concurrent Multidisciplinary Engineering (CME), Bremen,Springer Verlag,1998.

Thoben, K.D. and F. Weber, Supporting Decision Making and Communication in a Concurrent Engineering Environment: Information Technology and Social Aspects, Preprints of the first International Symposium on Concurrent Enterprising, ISoCE'98, Sinaia, Romania, 1998.

Beyer, N., et al., An Approach for a Practical Communication and Decision Support Environment for Supporting and Managing Concurrent Product Development, Proceedings of the 5th International Conference on Concurrent Enterprising (ICE), The Hague, Quorn Selective Repro,1999.

Belecheanu, R.; Haque, B.; Pawar, K.S.; Barson, R., Decision Support Methodology for Early Decision Making in New Product Development—A Case Based Reasoning Approach, Proceedings of the 5th International Conference on Concurrent Enterprising (ICE), The Hague, Quorn Selective Repro,1999.

Beyer, N., et al., Concepts and Prototype for a Practical Communication and Decision Support Environment for Supporting and Managing Concurrent Product Development, Proceedings of the European Concurrent Engineering Conference (ECEC), SCS Publications, Germany, 1999.

Bredehorst, B., et al., Methodical Approaches for the Design of Information and Communication Structures in Product Development—An Analysis of the Current Procedure in German Design Departments, Proceedings at the 6th International Conference on Concurrent Enterprising,Toulouse, France, Jun. 28-30, 2000.

SAP Customer Success Story, Hansgrohe AG, SAP AG, 2004.

IntelliDoc Technology, Cohesia Data Sheet, Mason Ohio, 2004.

Albers, Albert and D. Schweinberger, The Process Chain From Market to Product—A Concrete Instrument for Product Innovation, International Conference on Engineering Design, ICED 99, Munich, Aug. 24-26, 1999.

Roeske, Klaus, IMS Program Abstract, http://vwvw.ims.org/projects/project_info/icappacs.html, Feb. 9, 2003.

Belecheanu. R. et al., ARICON Initiative: Barriers in adopting the Virtual Enterprise approach in new product development (NPD) context, 2003.

Weber, Frithjof, The PACE Project, a Practical Approach to Concurrent Engineering, http://www.biba.uni-bremen.de/projects/pace/, Nov. 15, 1998.

Thole, Clemens-August, SIMDAT Data Grids for Process and Product Deelopment using Numerical Simulation and Knowledge Discovery, grid@asia second workshop Shanghai Feb. 20-22.

International Searching Authority/US, International Search Report and Written Opinion, Application No. PCT/US06/31318, Jul. 31, 2007.

* cited by examiner

CREATING, DESIGNING, MANAGING, SCHEDULING, DEVELOPING AND PRODUCING PRODUCTS

RELATED APPLICATION INFORMATION

This patent claims the benefit of Provisional Patent Application No. 60/707,484 filed Aug. 10, 2005, the contents of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to creating, designing, managing, development, scheduling, organizing, and producing products and/or components using one or more networked computers and databases.

2. Description of the Related Art

Designing products can be a complex undertaking, particularly when the product itself is complex, consisting of multiple interrelated components. The interrelated components may also be inter-dependent, such that the specifications for a particular component impact one or multiple other components. The interrelated nature of components cause a domino effect such that when changes are made to one component, multiple components may be directly impacted, which in turn impact the design and specifications of other components, and so on.

When designing product, multiple persons on multiple teams may contribute to the interrelated interdependent components. Multiple persons and multiple teams of persons may collaborate on the design and development of new products. The persons involved with product and/or component design and development may require access to specifications for one or more components so that they may effectively design and develop components for which they are responsible.

Some systems that have been used to assist in the design and development of products and their components include computer aided engineering (CAE) systems, computer aided design (CAD) systems, computer aided manufacturing (CAM) systems.

DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION

Throughout this description, the embodiments and examples shown should be considered as exemplars, rather than limitations on the systems and methods disclosed or claimed.

A system for creating, designing, managing, scheduling, organizing, developing and producing new products may be implemented in software that may be run on a server computer, personal computer and/or other computing devices, all of which may be connected via a network. The creating, designing, managing, scheduling, organizing, developing and producing new products may include the sharing of information over a network. The systems, methods, and software described herein are referred to by the acronym PDP for "product design and production." However, use of the acronym PDP and referring to the systems, software and methods described herein as PDP or "product design and production" in no way limits the disclosure. PDP systems, software and methods may be inclusive of project management, project scheduling, team interaction, team management, collaborative product design, collaborative product development, data management, data representation, component coordination, and other concepts.

The PDP systems, software and methods disclosed herein may be used with the design and development of an entire product, entire subsystems or assemblies, as well as with components, parts, or other portions of an entire product. The PDP systems, software and methods provide and rely on an underlying knowledge structure that is implicit through the system.

Figure 1:
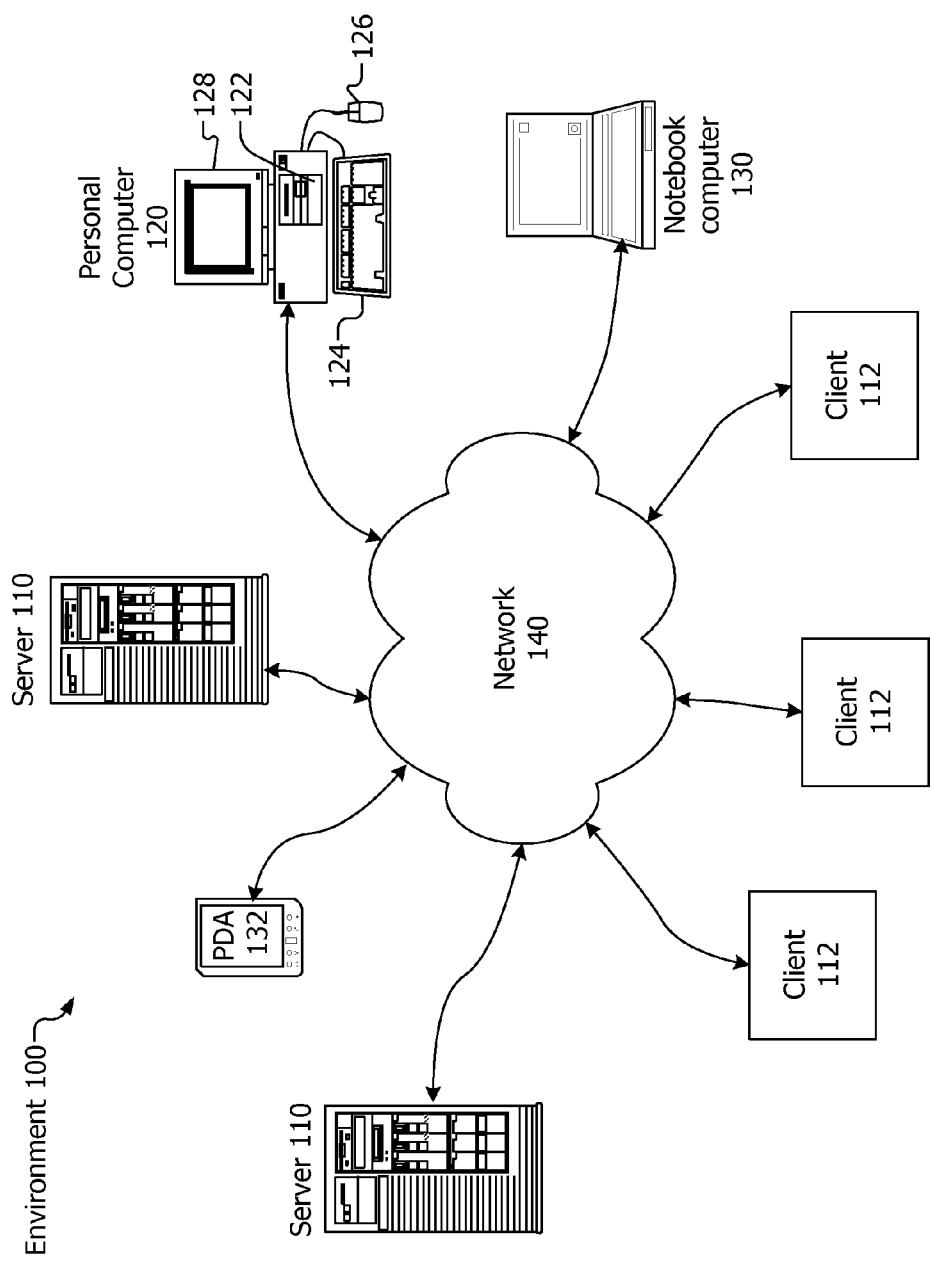
FIG. 1 is a block diagram of an environment in which the methods described herein may be implemented.

Referring now to FIG. 1, there is shown a block diagram of an environment 100 in which the systems and methods described herein may be implemented. In the environment 100, multiple client devices 112 may be coupled with and communicate over network 140 with one or more servers 110.

Servers 110 and clients 112 are computing devices. A computing device as used herein refers to a device with a processor, memory, a storage device, and a network interface device. The computing device may execute instructions stored in memory and/or on the storage device. The network interface device allows for communication over network 140. The network interface device may be a network interface card (NIC), an Ethernet card or other communications device that allows for wired or wireless communications over network 140. The term computing device includes, but is not limited to, personal computers 120, server computers 110, computing tablets, personal digital assistants (PDAs) 132, portable computers, notebook computers 130, and laptop computers. Computing devices may run an operating system, including, for example, variations of the Linux, Unix, MS-DOS, Microsoft Windows, Palm OS, and Apple Mac OS X operating systems.

The techniques described herein may be implemented in software stored on a storage medium accessible either directly or via a storage device included with or otherwise coupled or attached to a server 110, personal computer 120, a notebook computer 130, and/or other computing devices shown as clients 112. These storage media include, for example, magnetic media such as hard disks, floppy disks and tape; optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include, hard disk drives, DVD drives, flash memory devices (such as readers and writers), and others.

The processes, functionality and features of the PDP system may be embodied in whole or in part in software which operates on a server 110. The software may be or include, for example, one or more application programs, one or more modules, applets (for example, a Java applet), browser plug-ins, COM objects, dynamic linked libraries (DLLs), scripts (for example, PHP), active server pages (ASPs), one or more subroutines, an operating system component or service, and/or a combination thereof. The software may be implemented using a programming language of a high level and/or a low level nature, such as for example, C, C++, Visual Basic, assembly, Java, and others. The hardware and software and their functions may be distributed such that some portions are performed by a server computer and others by other server computers, and, in some embodiments, by client devices.

The PDP system may read and/or store files in one or more formats, including, for example, ASCII, EBCDIC, the extensible markup language (XML), the hypertext markup language (HTML), other markup languages, the portable document format (PDF), TIFF, Microsoft Word document format, rich text file (RTF) format, Microsoft Excel spreadsheet format, Microsoft PowerPoint format, comma separated variable (CSV) format, and others.

The PDP system may access or include other existing software. For example, the PDP software may include a portable document format (PDF) driver or access a PDF compatible application or plug-in available on the user's computing device or on the server 110.

The PDP software may be developed in whole or in part using the Eclipse Software Development Kit and/or other Eclipse software and/or may access software from the Eclipse Platform and/or other Eclipse software available from the Eclipse Foundation, Inc. of Ottawa, Ontario, Canada and/or other sources, including plug-ins, assistants, add-ons and others.

A server 110 is typically more robust than a client device 112 and typically has greater processing capabilities, greater network throughput, and/or greater storage space when compared to a personal computer 120 or other client device 112. Although shown as single servers, servers 110 may be a server farm, group of servers (including application servers, database servers, content servers, and others), and may include a firewall, load balancer, and other network devices; and may include multiple devices in multiple locations. The servers 110 may provide one or more databases and other facilities to receive, store, process, manage, and evaluate product and component data as described herein. The servers 110 may include software for providing the functionality and features described herein. Although two servers 110 are shown, only one server or more than two servers may be used to implement the PDP systems, software and methods described herein. Databases and database servers provided by third parties may be accessed by server 110 via network 140. For example, one or more third party component or unit providers (that is manufacturers and/or distributors) may make their current catalog available as a database on servers accessible via a network. In addition, one or more third party component or unit providers (that is manufacturers and/or distributors) may make their current catalog available in software and/or as data files which may be downloaded via a network, installed from a CD-ROM, and/or otherwise stored on PDP servers 110.

A client device 112 may include software for communicating with the servers 110 to obtain the benefits of the functionality and features described herein. A client device 112 may be a computing device. Client devices 112 typically include a display, user input devices, and a storage media and storage device. For example, when the client device 112 is a personal computer 120, the personal computer 120 may include a display 128, a keyboard 124, a mouse 126, and a hard disk drive 122. A client device 112 may have these and/or other user input devices, and may have two or more displays, and two or more storage devices. Example client devices 112 include personal computer 120, notebook computer 130 and PDA 132.

The network 140 provides a communication medium for client devices 112 to communicate with the servers 110, for the servers 110 to communicate with one another, and for the client devices 112 to communicate with one another. The network 140 may be one of or a combination of a local area network, a wide area network, a storage area network, a private network, a data network, a public network, and others. In one embodiment, network 140 is the Internet. The network 140 may support various versions of the Ethernet protocol and other communications protocols, such as, for example, TCP/IP, UDP/IP, and others. The client devices 112 and server 110 may communicate over the network 140 via wired and/or wireless communications. The client devices 112 and server 110 communicate data units over the network 140. As used herein, a data unit refers to a frame, cell, datagram, packet or other unit of information.

Figure 2:
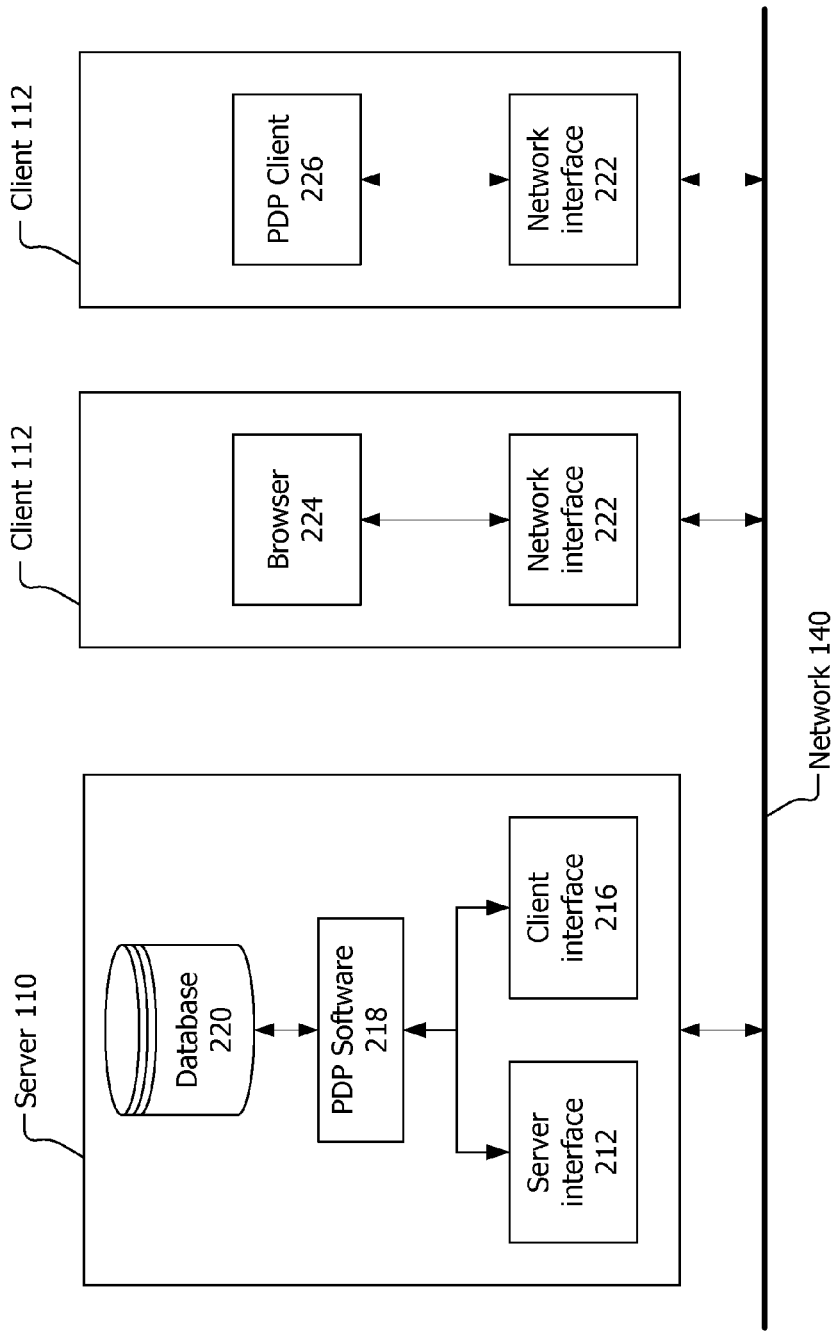
FIG. 2 is a block diagram showing some of the software components which may be used to implement the methods described herein.

FIG. 2 is a block diagram showing some of the software components which may be used to implement the systems and methods described herein. Both the server 110 and the clients 112 include an operating system which may include and/or be augmented by communications software. The PDP software 218 may be or include, for example, one or more application programs, one or more modules, applets (for example, a Java applet), browser plug-ins, COM objects, DLLs, scripts (for example, PHP), ASPs, one or more subroutines, an operating system component or service, and/or a combination thereof, some of which may be downloaded to clients 112. The PDP software 218 may access one or more local databases 220 and may access remote databases. The PDP software may provide the functionality described herein in conjunction with an Internet browser 224 and/or a PDP client 226 running on a client device 112.

In one embodiment, the client 112 communicates with the server 110 via a browser 224 and network interface 222 over network 140. The browser 224 may be an Internet browser such as Microsoft Internet Explorer, Mozilla Firefox, and others. The network interface software 222 may be a network protocol stack, such as a TCP/IP stack. The network interface software 222 may operate in conjunction with a network interface device in the client 112. The client 112 may receive applets, scripts or other software from the server 110 which may be executed via the browser 224.

In one embodiment, the client 112 communicates with the server 110 via PDP client software 226 and network interface 222 over network 140. The PDP client 226 may be a simple terminal window, may be an application program that provides for the local processing of component and product information, or may be something in between. The PDP client 226 may include or be an application program, an applet, a module, a DLL, or other software that may be executed on the client 112.

Similarly, the server 110 communicates with client devices over network 140 via client interface 216. The client interface 216 may be implemented to provide communications with client devices 112 via a browser 224 or a PDP client 226. In addition, in embodiments where there are multiple servers 110, the servers may include a server interface 212 to allow for the sharing of information between servers over network 140. The server 110 may have one or more databases 220 included therein, coupled therewith, or accessible thereto. In one embodiment, the PDP software accesses component and other information stored on remote database servers. The server 110 may include two or more homogeneous or heterogeneous databases, and/or access a combination of local and remote homogeneous or heterogeneous databases. The database 220 and other databases, be they local or remote, may be object oriented, relational, structured query language (SQL), and/or other. The servers 110 may access databases or provide access to the database 220 via the Open DataBase Connectivity (ODBC) standard, via Java Database Connectivity (JDBC) or other standard and/or proprietary technique.

Figure 3:
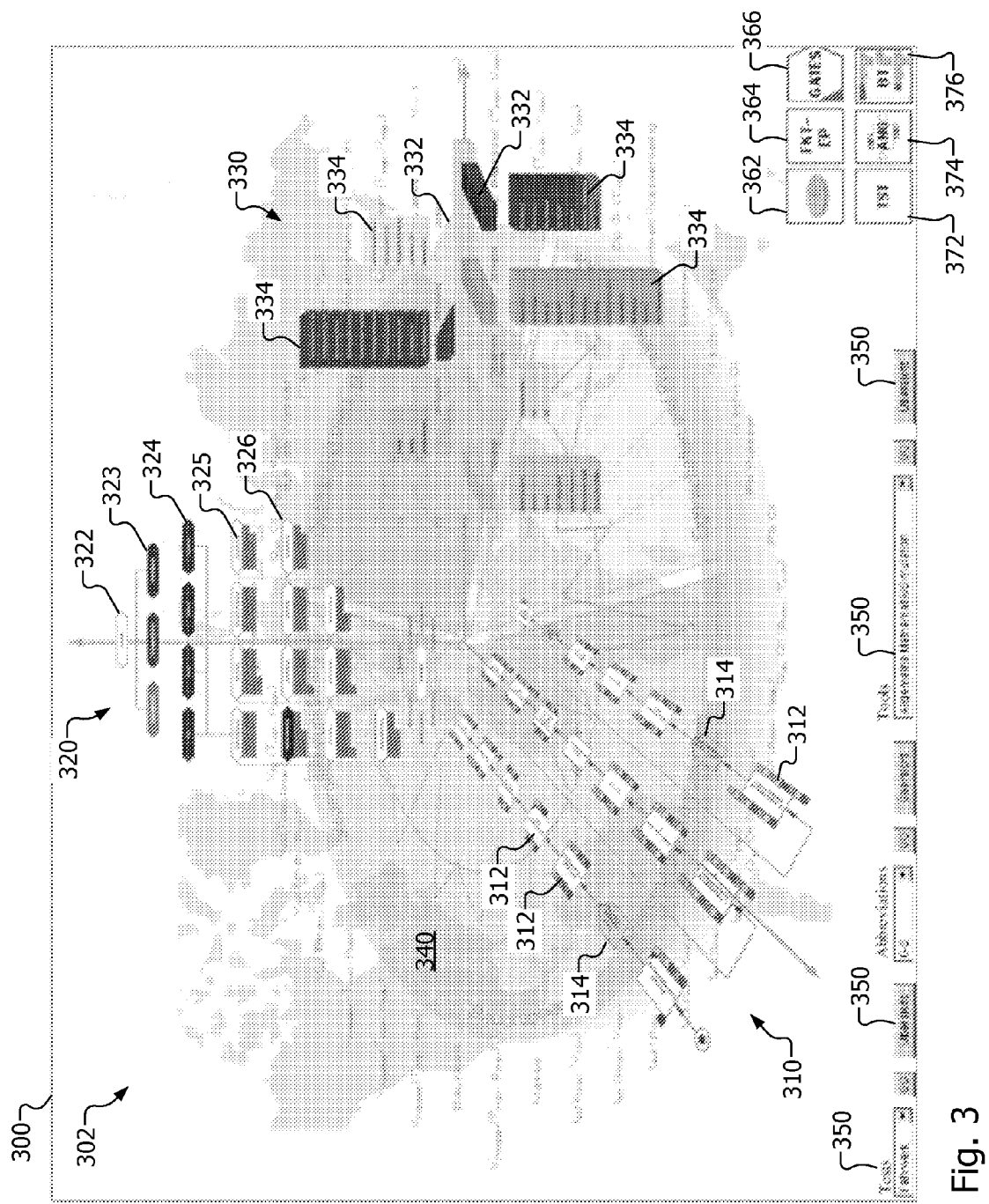
FIG. 3 is a window showing a graphical representation provided by a product design, development and production system according to the methods described herein.

FIG. 3 is a window 300 showing a graphical representation 302 provided by a product design, development and production system according to the methods described herein. The PDP software 218 may provide the graphical representation 302 in window 300 via the PDP client 226 and/or the Internet browser 224. The graphical representation 302 may be made up of four interrelated elements, three each depicted on one of three axes representing three dimensions, and a fourth in an underlying circle. A first axis represents the process chains 310 needed to design, develop and/or produce the product; a second axis represents the functional elements 320 of the product; and a third axis represents the product structure 330. The fourth element is an underlying circle that represents the complex relationship between the product structure and functional elements, and the values associated with their relationship. The underlying circle may be referred to as and represent the relational interfaces 340 for the constituent components, subsystems, and other units and functions involved in the design, development and production of a product.

Further information about each of the graphical elements may be obtained by clicking on, selecting or otherwise activating a graphical element. For example, information about the product structure 330 may be obtained by clicking on the axis running through the center of the fish bone of the product structure 330. In another example, information about a subsystem 334 may be obtained by clicking on a subsystem included in the fish bone of the product structure 330.

More specifically, the first axis may show a representation of the process chain 310 for a product. The process chain may include interface processes 312, working processes, and gates 314. A process chain may depict and provide information about the steps to take to design, develop and/or produce a particular system, subsystem, component or unit, including information about interrelated physical, chemical, and other properties, tools, interface requirements, fit requirements, connection requirements, characteristic values, as well as information about the stage, maturity or degree of completion. The process chain may include gates 314 to indicate the maturity of the staged creation, development and/or production of a product. Information about the process chain may be obtained by clicking on the axis running through the process chain 310. Information about an interface process or gate may be obtained by clicking on the representation of the interface process 312 or gate 314 included in the representation of the process chain 310.

The second axis may show a representation of the structured functional elements 320 of a product. The functional elements include physical, chemical, thermal, thermodynamic, acoustic, electric and other properties. The functional elements include a functional class 322 or type, basic requirements 323, extended requirements 324, functions 325, sub-functions 326. The functional elements may be thought of as the inverse of the view of the product structure 330. Information about functional elements may be obtained by clicking on the axis running through the functional elements 320. Information about a functional class, basic requirements, extended requirements, functions, and sub-functions may be obtained by clicking on the representation of the functional class 322, basic requirements 323, extended requirements 324, functions 325, or sub-functions 326 included in the representation of the functional elements 320.

Figure 12:
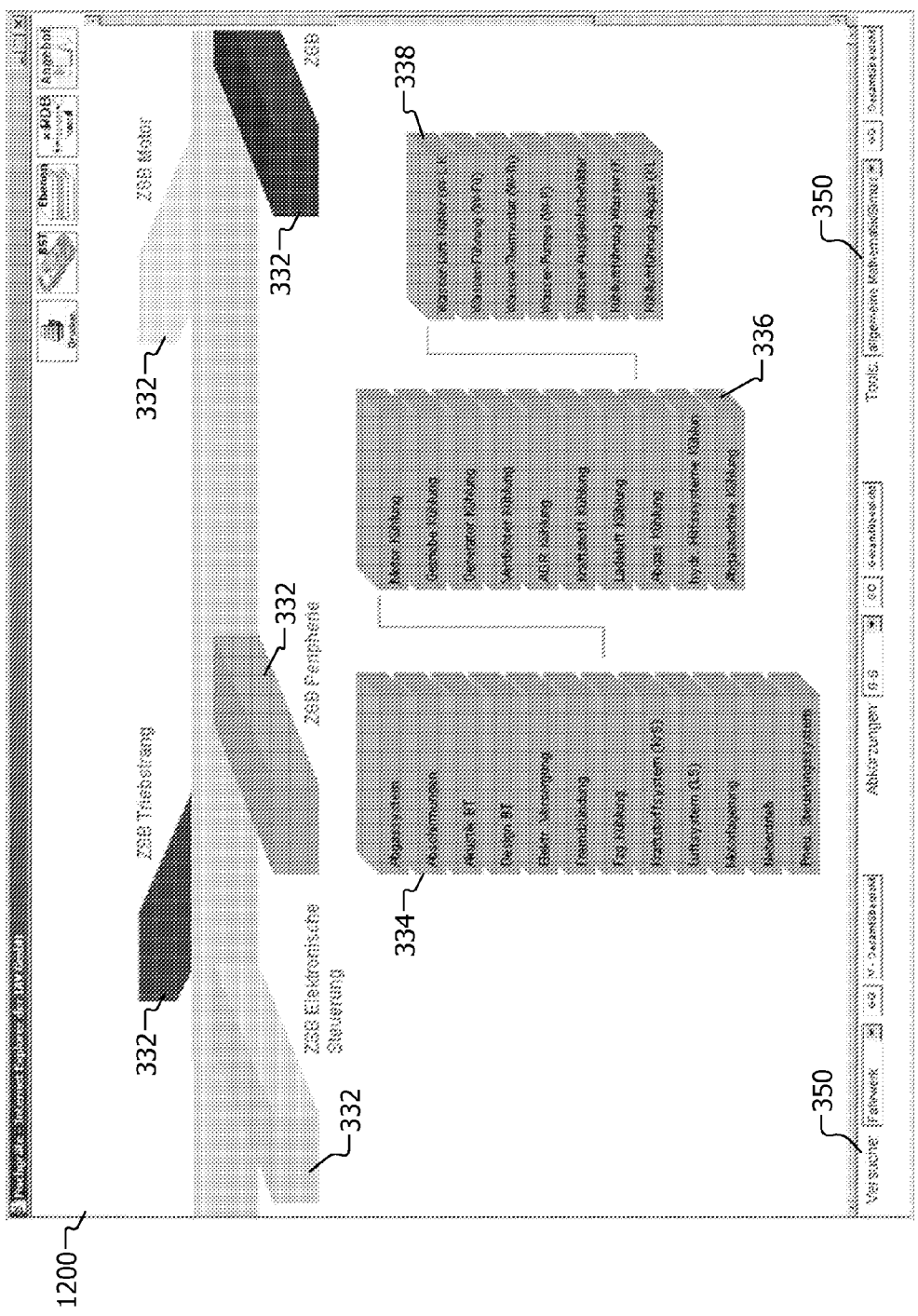
FIG. 12 is a screen shot showing a fish bone of the main systems, subsystems and units provided by a product design, development and production system according to the methods described herein.

The third axis may show a representation of the product structure 330. The product structure 330 includes the physical systems and constituent subsystems, units and subunits. For example, a system may include or be an engine; a subsystem of the engine may be a lubricating system; a unit of the lubricating system may be an oil pump; and a subunit of the oil pump may be an oil pump housing. The representation of product structure 330 may be referred to as a fish bone or herring bone. Each main system 332 and subsystem 334 of the product under design, development and/or production is depicted in the product structure 330 graphical representation. By selecting, clicking on or otherwise accessing a main system 332, a representation of its constituent subsystems 334 may be displayed, either in the current window or in a new window. By selecting, clicking on or otherwise activating a subsystem 334, units and components of the subsystem 334 may be viewed in a new window or may replace the current window. A showing of a product structure 330 and its constituent systems, subsystems, units and subunits is shown in FIG. 12 as described below.

In one embodiment, the product under design, development and/or production is an automobile, and the main systems 332 include a body, a drive train, an engine, a suspension, electronics, environmental systems, and others. The subsystems 334 of the suspension main system 332 may include a steering system, brakes, and wheel control. The subsystems 334 of the engine main system 332 may include an engine, a transmission, a cylinder head and a lubrication system. The subsystems 334 of the body main system 332 may include interior subsystem, exterior subsystem, and bodywork subsystem. The subsystems 334 of the environmental main system 332 may include an air subsystem, an exhaust subsystem, and a vehicle cooling subsystem. The subsystems 334 of the drive train main system 332 may include an electric drive subsystem, a manual transmission subsystem and an automatic transmission subsystem.

In one embodiment, underlying the three axes is a representation of physical and other characteristics referred to as a relational interfaces circular chart 340. The relational interfaces 340 may provide data about the physical, chemical, thermal, thermodynamic, acoustic, and other properties, including inputs and outputs, of various components, subsystems, and units included in the product under design, development and/or production. The relational interfaces circular chart 340 may include a combination of the information available via the fish bone representation of product structure 330 and the functional elements 320 along with mathematical relationships between the product structure 330 and the functional elements 320. The relational interfaces circular chart 340 may also be described as and referred to as a representation of physical and other characteristics of the product, system, subsystem and units being designed, created, produced, and constituent components and parts thereof.

The various features and functionality of the PDP system may be accessed by selecting, clicking on or otherwise activating the graphical representations already described, including the process chain 310, the functional elements 320, the product structure 330, the relational interfaces circular chart 340, and their constituent elements. The clicking on, selecting or other activation may be achieved by a user interface device such as a mouse, trackball, pen and tablet, touch pad, scroll wheel, joy stick, touch screen, and other user interface devices and techniques. PDP software recognizes the input and responds accordingly.

Figure 15:
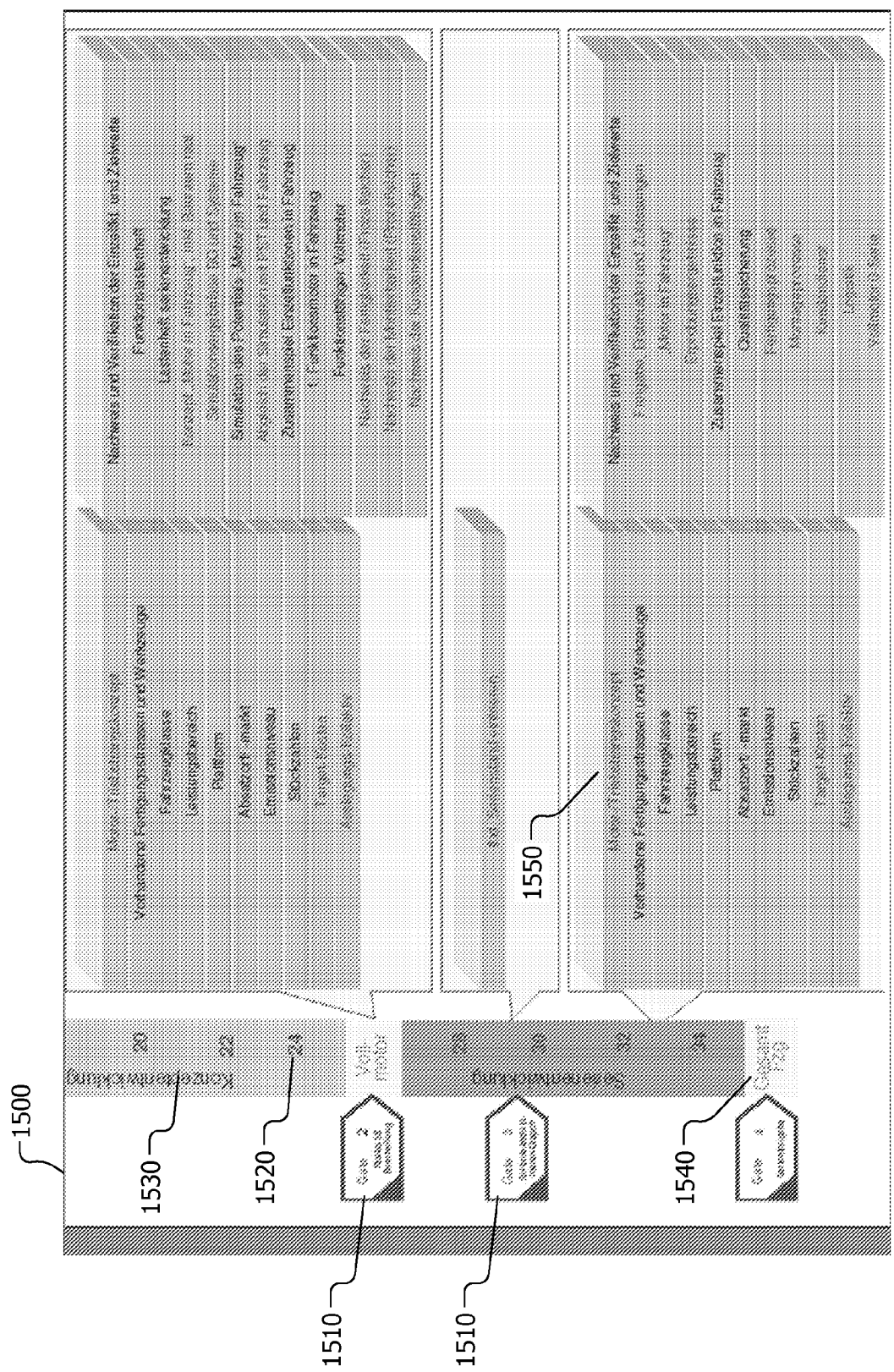
FIG. 15 is a screen shot showing the gates provided by a product design, development and production system according to the methods described herein.
Figure 16:
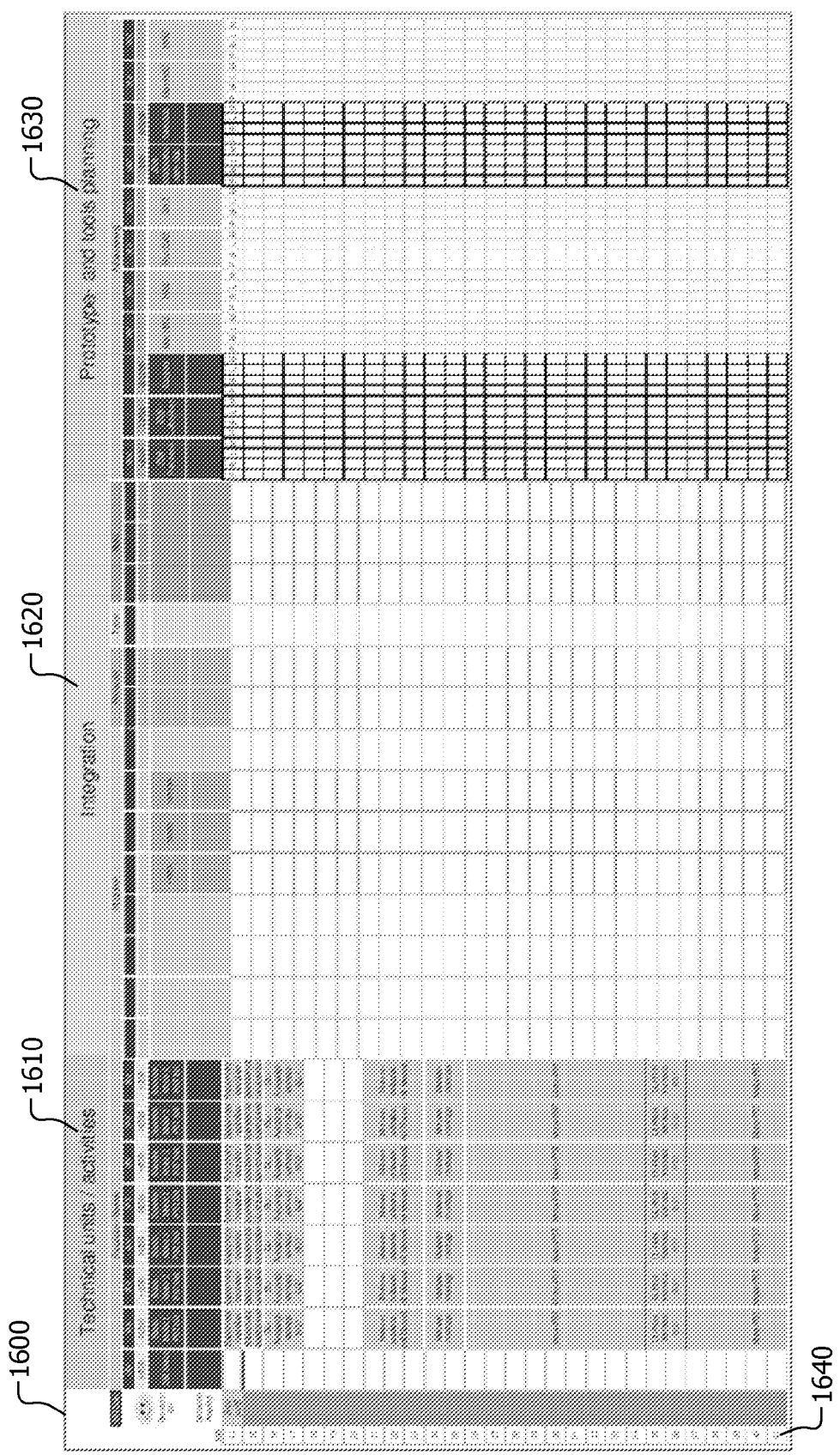
FIG. 16 is a screen shot showing a first example of technical controlling information provided by a product design, development and production system according to the methods described herein.

In addition, various features and functions of the PDP system may be accessed by clicking on various extension icons 362, 364, 366, 372, 374 and 376. One or more of the extension icons may be tied to plug-in software, add-on software or other software providing extended features of and/or to the PDP system. The extension icon 362 may allow a user to access a representation of the relational interfaces 340. Extension icon 364 may allow a user to access an overview of each of the process chains, functional elements, product structure and relational interfaces. The overview may be in the form of a table, chart or other graphical representation. Extension icon 366 may allow a user to access definitions and/or other information about the gates 314 which may represent milestones, stages, maturity or other transitional phases or demarcation of achievements. The gates 314 are shown in FIG. 15 as described below. Extension icon 374 may allow a user to generate project management documents including a project structure plan, a project offer or proposal, a price and resource analysis, a time schedule, and others. Extension icon 372 may allow a user to access an overview of the technical controlling information for a new project and/or to have the PDP system create or generate technical controlling information based on user input. Example technical controlling information is shown in FIG. 16 as described below. Extension icon 372 may allow a user to generate or calculate physical and other characteristics, inter-relation requirements or other information about a system, subsystem, unit or subunit of a product, or an entire listing of some or all information about a product. The results of the generation or calculation may be presented on a user's display and/or may be stored as a file. Extension icon 376 may allow a user to access information about the physical components of the product. Another extension icon may link the PDP system and user to access other software applications, including, for example, application programs offered by SAP, Microsoft and others. This access may be used to import data to or export data from the PDP system, to perform analyses or data look-up, and for other purposes. More and fewer, as well as different extension icons may be provided. The extension icons may be included in a drop down menu. The extension icons may be included in other locations in the window 300, such as in a line along a bottom, top or side edge of the window 300.

The window 300 may be augmented with or otherwise include user interface elements 350 such as text entry fields, pull down menus, buttons, sliders, and others, some of which are shown in FIG. 3. The user interface elements 350 may allow the user to run PDP system provided commands, adjust a particular view, select a particular view, search for a particular system, subsystem, function, process, or component, and take other actions.

Figure 4:
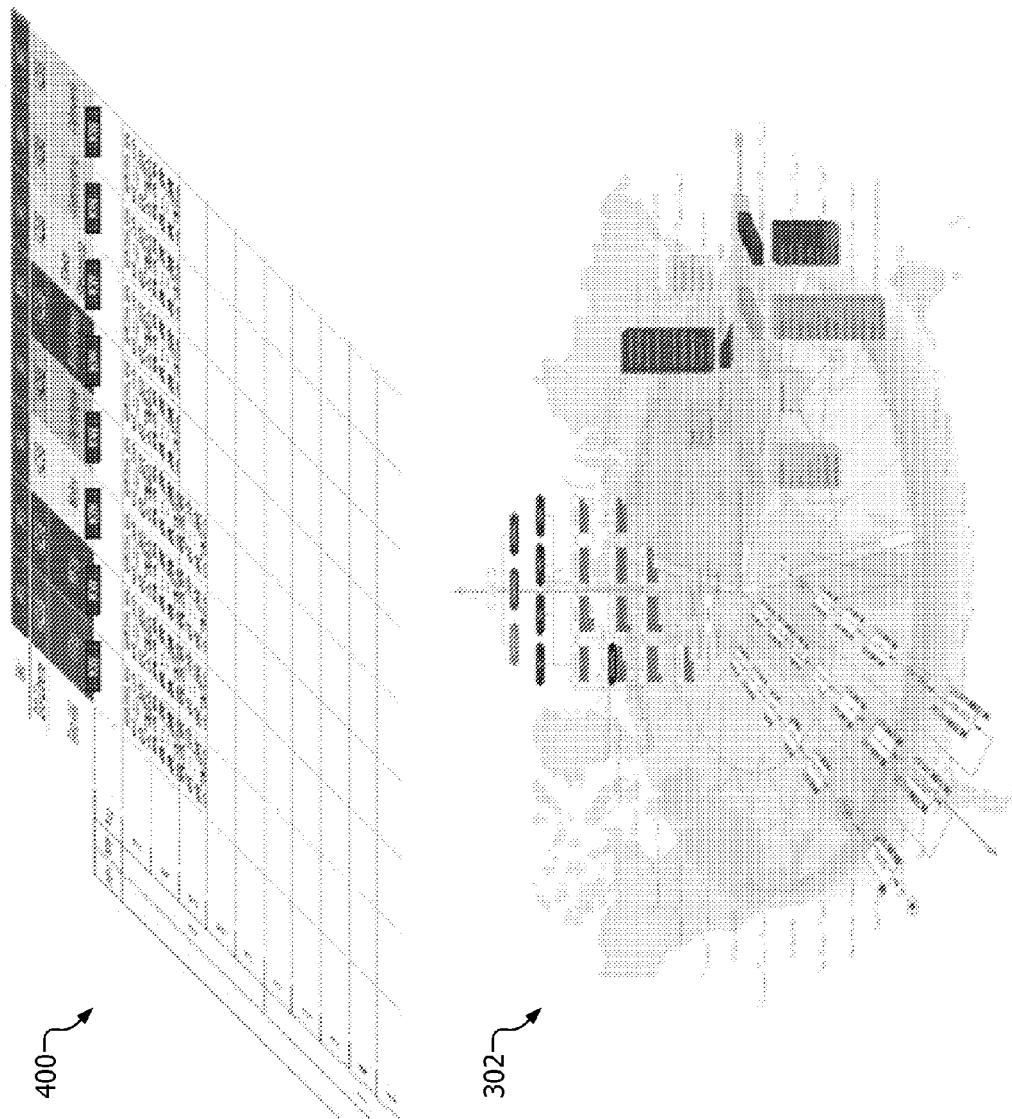
FIG. 4 is a graphical representation and table provided by a product design, development and production system according to the methods described herein.

FIG. 4 shows graphical representation 302 augmented with a PDP table 400 according to the methods described herein. In this drawing, which may be included on a user's display screen by the PDP system, the graphical representation 302 is augmented with a PDP table 400. The PDP table 400 may include information from the graphical representation 302 in table form, including information from the process chains 310, the functional elements 320, the product structure 330 and/or the relational interfaces 340. By using user interface elements, a user may select to view only PDP table 400. In one embodiment, the PDP table 400 may be replaced with the technical controlling information shown in FIG. 16 and/or 17 as described below.

Figure 5:
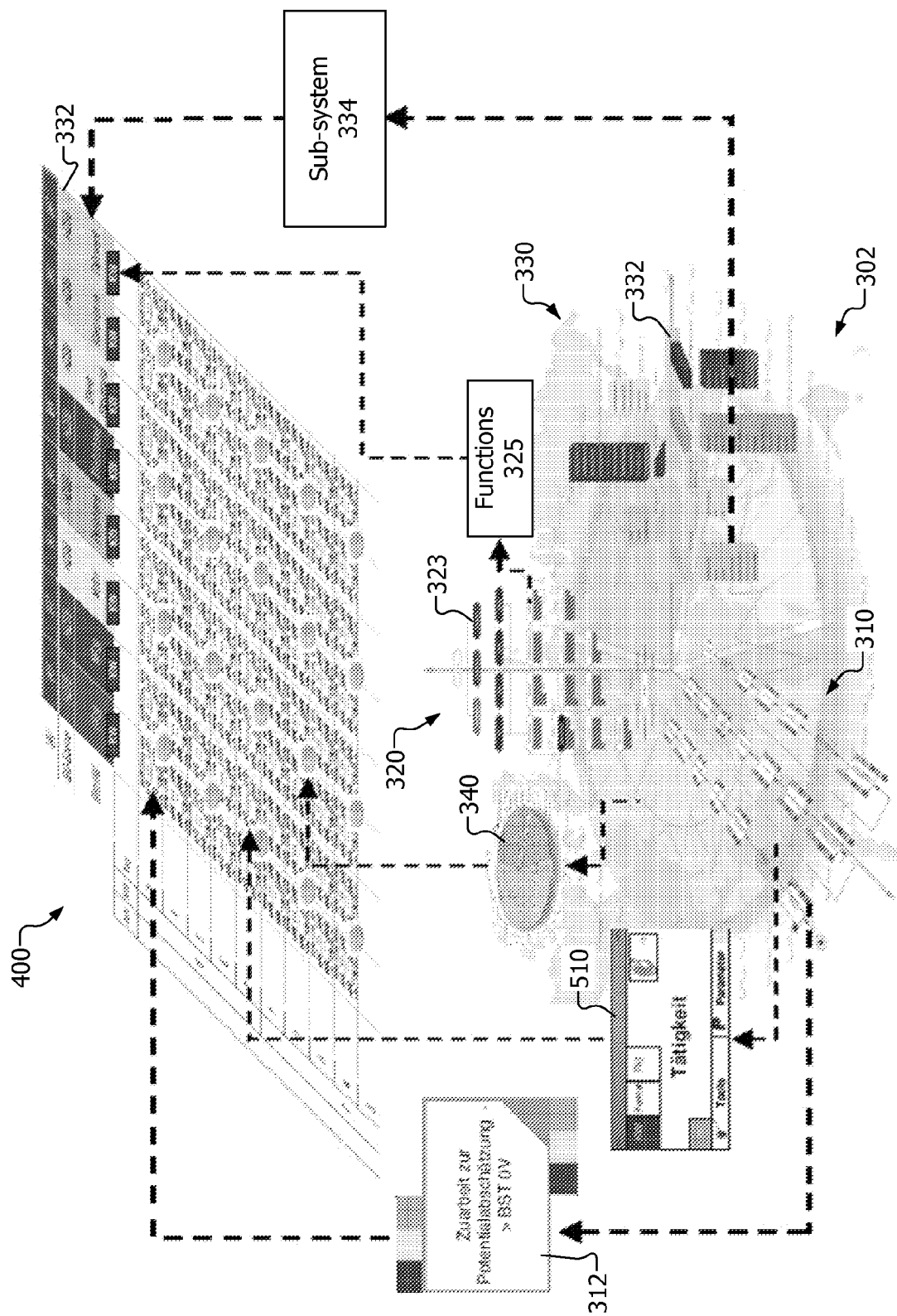
FIG. 5 is a diagram showing the relationship between a graphical representation and table provided by a product design, development and production system according to the methods described herein.

FIG. 5 is a diagram showing the relationship between a graphical representation 302 and PDP table 400 according to the methods described herein. The working processes 510 and interface processes 312 from the process chain 310 are included in the PDP table 400 as shown. The functions 325 and the functional elements 320 are included in the PDP table 400 as shown. The subsystems 334 and the main systems 330 are included in the PDP table 400 as shown. The data interfaces from relational interfaces 340 are included in the PDP table 400 as shown. The PDP table is arranged such that the columns show the relationships between the systems 332, subsystems 334, units and components. The relationships between the systems 332, subsystems 334, units, components, functions 325, sub-functions 326, relational interfaces 340, working process 510 and interface processes 312 are provided with the representation of the relational interfaces 340.

Figure 6:
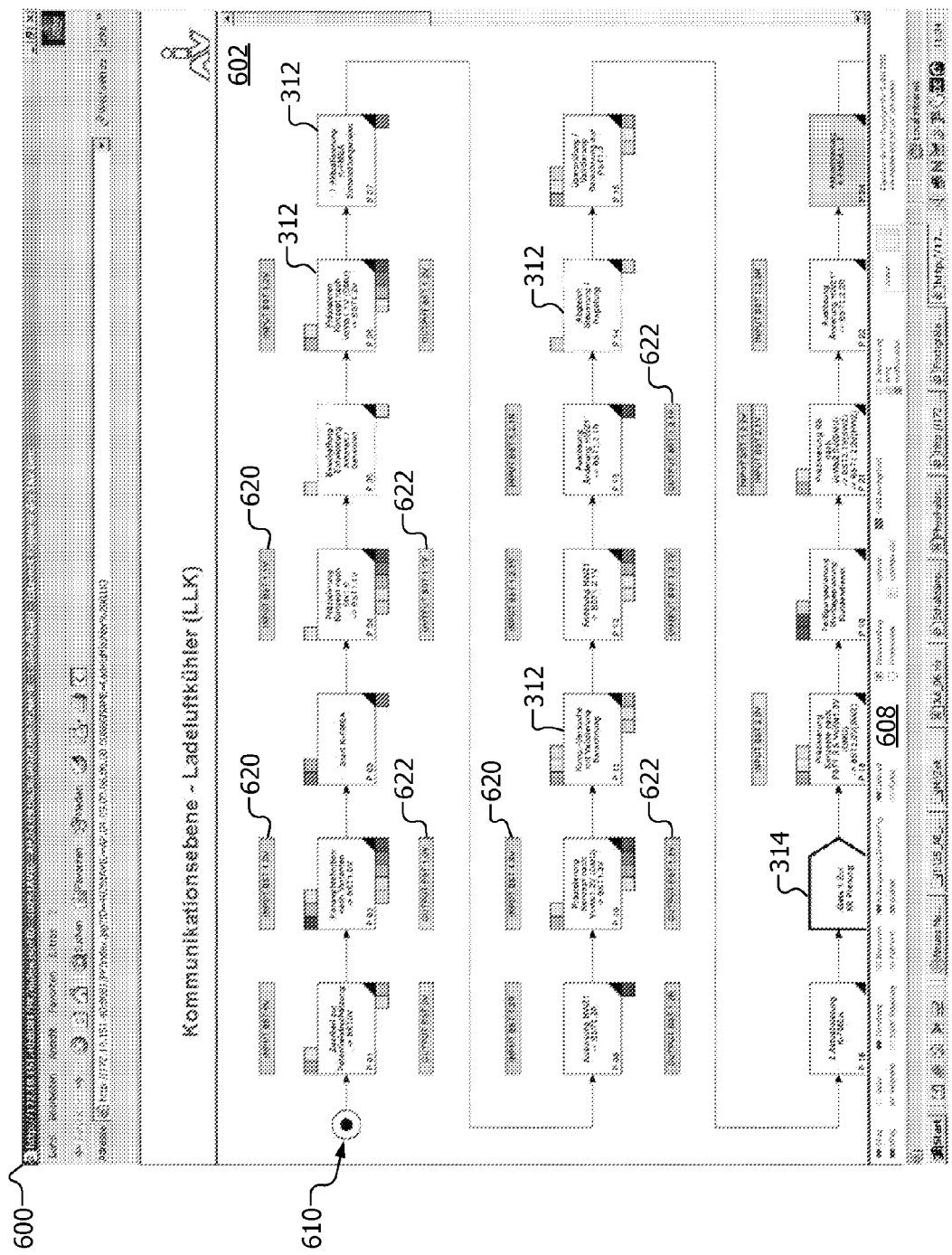
FIG. 6 is a screen shot of part of an interface process chain provided by a product design, development and production system according to the methods described herein.

FIG. 6 is a screen shot of part of an interface process chain 610 provided by a product design, development and production system according to the methods described herein. The interface processes 312 and the interface process chain 610

(in conjunction with the working process chains described below) allow a user to view the synchronization between and physical compatibility of various systems, subsystems, components and units. This includes the input and/or output gases, fluids, oil, water, heat, electricity, and other characteristics. In one embodiment, when there is an incompatibility between processes and/or their constituent components, the PDP software and system may alert the user to this by graphical warnings, such as by presenting a red flag, a black flag, a yellow diamond, a balloon with information, and other user interface techniques that may include text and/or graphics as well as sound. Further information about the warning may be obtained by hovering a cursor over the icon or by clicking on, selecting, or otherwise activating the warning icon.

The process chain 610 may be presented in a browser window 600 comprised of a main pane 602 in which the process chain 610 is displayed. The process chain 610 may include processes 312 linked together, gates 314, and information about inputs 620 and outputs 622 of the processes 312 of the staged development of a product, as well as input interfaces and output interfaces which are described in the graphical representation of processes provided in FIG. 7 and discussed below.

The browser window 600 may also include pane 608. In one embodiment, pane 608 contains a key describing various aspects of the processes 312 and other graphical elements provided in process chain 610. For example, the key in pane 608 as shown depicts how dashed lines mean that a process is optional. The key in pane 608 also depicts which colors represent each of various components, systems, subsystems, etc. Pane 608 or a third pane, not shown, may be used to display information about the processes in the interface process chain, aspects of processes in the process chain, and/or the interface process chain. The pane 608 may provide links to click on to be provided information about the processes in the interface process chain, aspects of processes in the interface process chain, and/or the interface process chain.

The interface process chain 610 may include multiple interface processes 312 linked together. Each interface process 312 may be augmented with input information 620 and output information 622 for the staged development of a product. The PDP system may make text entry fields, check boxes, menus, and other user interface elements available for a user to enter information about the interface processes 312 or the interface process chain 610. Further, the PDP system may make detailed information about the interface process chain 610 or a particular interface process 312 available for viewing and/or editing via menus, and other user interface elements provided in window 600.

Figure 7:
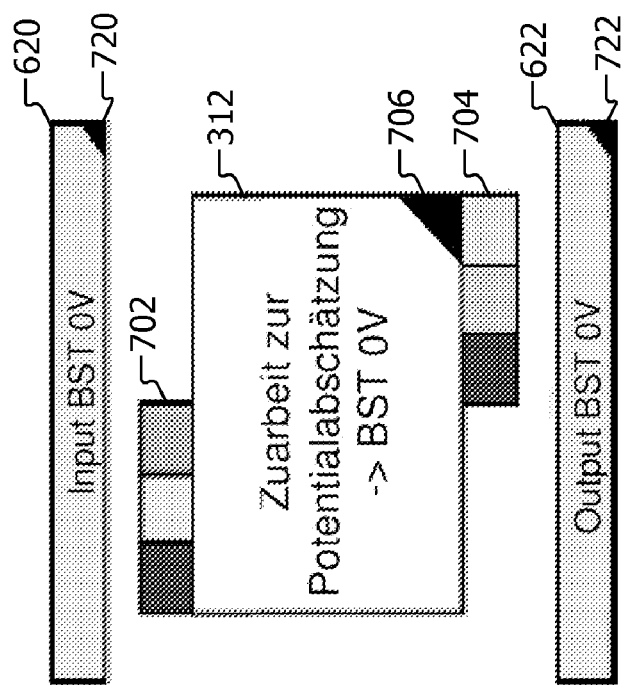
FIG. 7 is a single interface process of an interface process chain provided by a product design, development and production system according to the methods described herein.

FIG. 7 shows a single interface process 312 of a process chain 610 provided by a product design, development and production system according to the methods described herein. The interface process 312 includes colored boxes adjacent to the top and bottom of the rectangle of the interface process 312. The boxes may be colored to correspond to particular systems, subsystems, or other components. This makes for ready and easy association of the interface process with the system, subsystem, or other component represented by the color. The colored boxes on the top represent input interfaces 702 that specify systems, subsystems, or other components which provide input to the process 312. The colored boxes on the bottom represent output interfaces 704 that specify systems, subsystems, or other components which output of the interface process 312 is provided. Selecting, clicking on or otherwise activating an input interface 702 or output interface 704 may open a window with information about the particular input or output system, subsystem, etc. This may be achieved, for example, by right-clicking a mouse on one of the colored rectangles in input interfaces 702 or output interfaces 704 and selecting an item from a pull down menu. Selecting, clicking on or otherwise activating a colored rectangle input interface 702 or output interface 704 may allow a user to jump to a particular linked process in another process chain. This may be achieved, for example, by left-clicking a mouse on one of the colored rectangles in input interfaces 702 or output interfaces 704.

The interface process 312 may include a black triangle 706. Clicking on, selecting or otherwise activating triangle 706 causes a working process chain to be displayed. A working process chain is shown in FIG. 8

The input information 620 and output information 622 may be augmented with black or other colored rectangles 720 and 722. Selecting, clicking on or otherwise activating black triangles 720 and 722 may allow a user to jump to linked processes that provide the particular input information 620 or receive the output information 622 of the staged development process. Selecting, clicking on or otherwise activating input information 620 or output information 622 may provide details of the input information 620 or output information 622.

Figure 8:
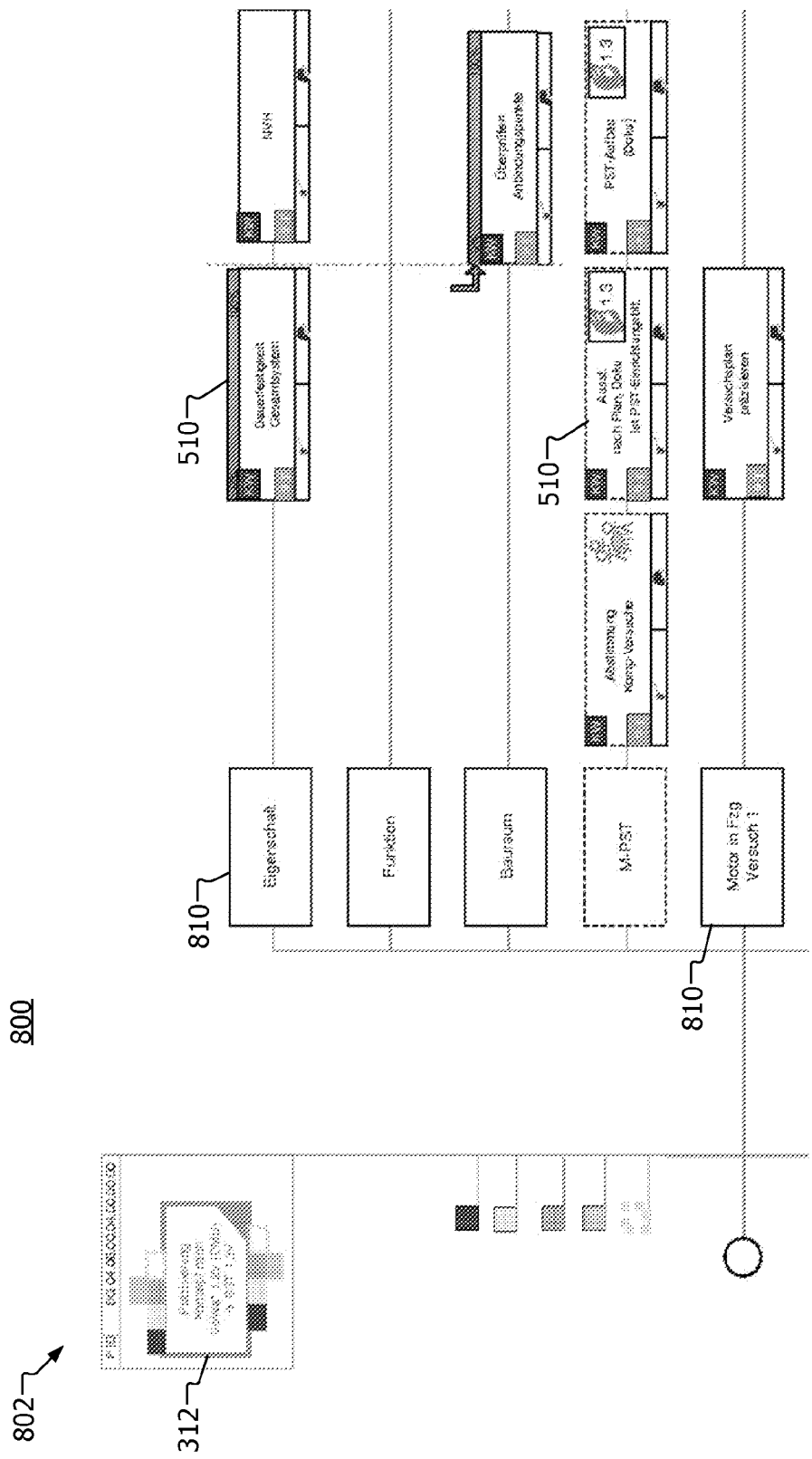
FIG. 8 is a screen show showing part of a working process chain provided by a product design, development and production system according to the methods described herein.

FIG. 8 is a screen shot 800 showing part of a working process chain 802 provided by a product design, development and production system according to the methods described herein. The working process chain 802 may be included in a window 800 in browser 224 or provided by a PDP client 226. The working process chain 802 is comprised of multiple working processes 510 linked together. Detailed information about the working process chain 802 or a particular working process 510 may be obtained by clicking on, selecting or otherwise activating a particular working process 510. The interface process 312 that was selected to jump to the working process chain 802 is shown. Various systems, subsystems functions, characteristics and other labels 810 may be depicted, including, for example, test bench, space (volume) requirements, subunits, and others.

Figure 9:
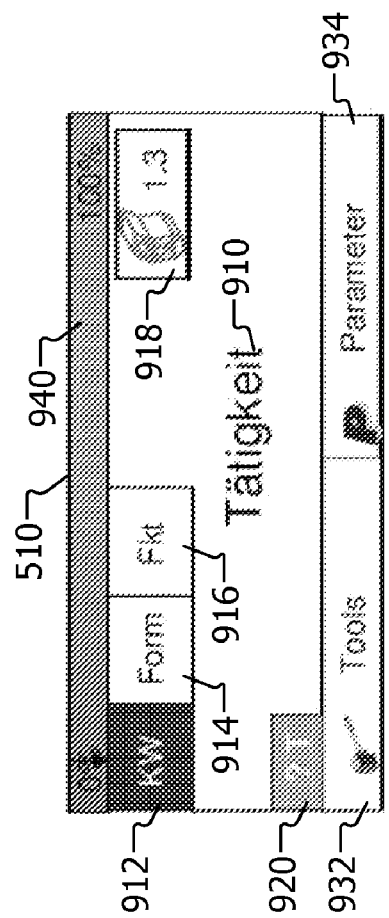
FIG. 9 is a single working process of a process chain provided by a product design, development and production system according to the methods described herein.

FIG. 9 is a single working process 510 of a process chain provided by a product design, development and production system according to the methods described herein. Each working process may include a top color portion 940 (which, in another embodiment, may be from light gray to black) to readily show the time interdependencies of the working process 510 which are linked by triggers. In one embodiment, a numerical percentage included in the top color bar 940 represents the time inter-dependence between the working process and another working process. In another embodiment, a degree of completion may be expressed as a numerical percentage in the top color bar 940 or in another location in the representation of the working process 510. The degree of completion may reflect an amount of time expended/to be expended on the working process.

Each working process 510 may include text labels in a location consistent among all working processes allowing a user the opportunity to click to examine the working process table 912, the data format 914, the related functions 916 involved in the working process 510. For example, clicking on text label for the working processes table 912 may bring up a working process table that provides information about the physical characteristics of the working process and their corresponding data formats and related functions. Another text label and/or icon 920 may allow a user to open a calculation table when selected, clicked on or otherwise activated.

Each working process may include an icon 918 representing a particular resource, such as, for example, test bench, prototypes, vehicles, and others involved in the working process 510. The working process 510 may also include a numerical reference and/or text label identifying a stage in the development of a product. In the example shown, the icon used (918) represents an engine, and the number represents a particular point in the staged development of the product. In another embodiment, the numeral reference may be a specific system, subsystem, unit, part or component reference number or other identifier. That an engine is shown or other system, subsystem or component is depicted may signify a maturity level or stage of current or completed development, such as at test bench, in engine development, in prototyping, in finishing, and others.

Each working process 510 may include a bottom rectangle broken into two parts, one displaying a tools icon and/or text label 932 that allows a user to click on, select or otherwise activate to access the tools required to perform the working process 510; and the other displaying a parameters icon and/or text label 934 that allows a user to click on, select or otherwise activate to access the parameters of the working process 510 and/or of constituent systems, subsystems, units, and components implicated by the working process 510.

Figure 10:
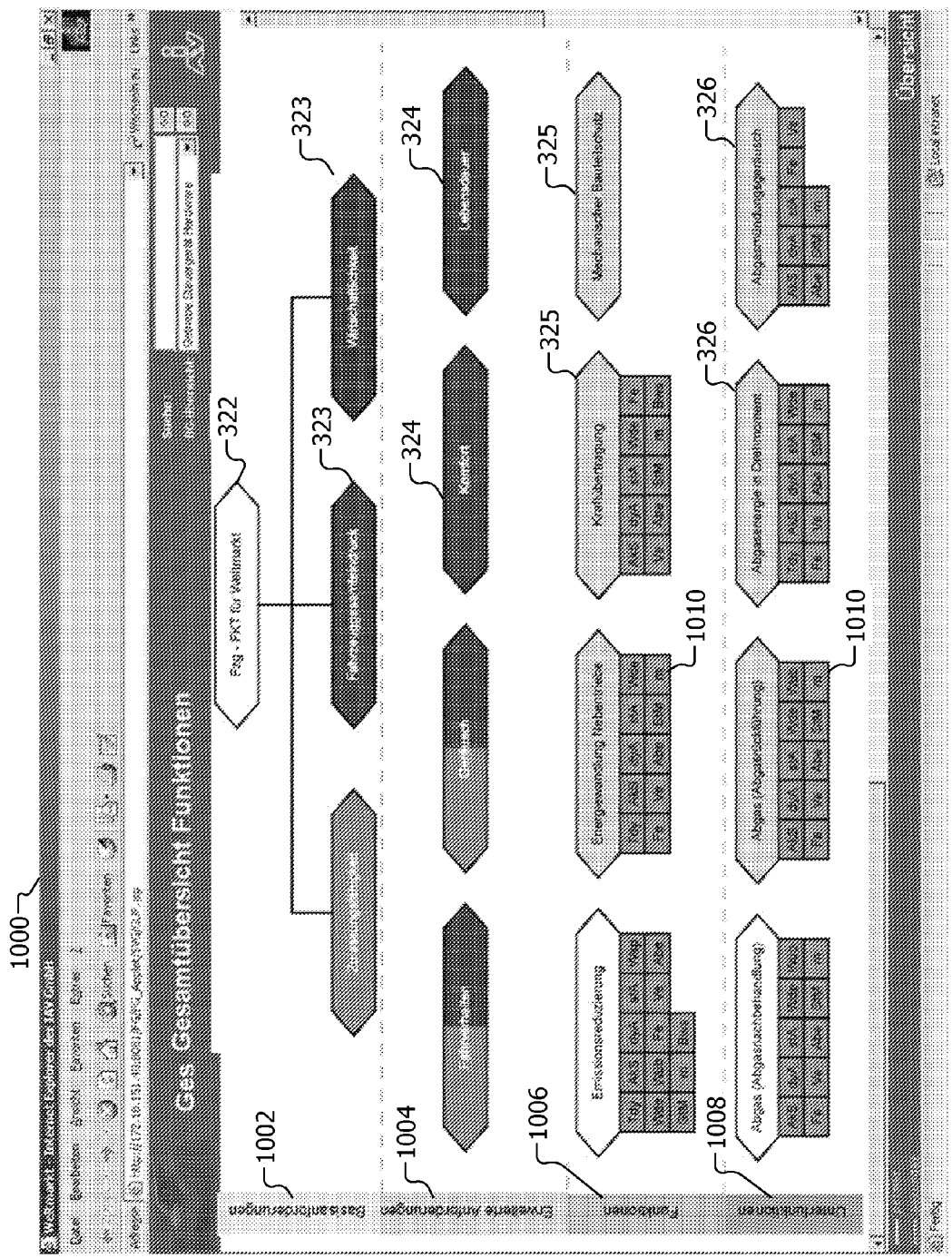
FIG. 10 is a screen shot showing the functions provided by a product design, development and production system according to the methods described herein.

FIG. 10 is a screen shot 1000 showing the functions provided by a product design, development and production system according to the methods described herein. The functions may be generally in a tree structure, with the leaves being at various levels. For example, the function goal 322 may be at the top, followed by basic requirements 323, extended requirements, functions 325 and sub-functions 326. In one example, the basic requirements 323 may include fuel economy, vehicle inspection completion, certification for road worthiness, and others. In one example, extended requirements 324 may include safety requirements, comfort, vehicle emissions, and others. In one example, functions 325 may include mechanical protection or resilience, power transfer, energy transformation, emission reduction, and others. In one example, sub-functions 326 may include exhaust treatment (for example, catalytic converter), and others.

The basic requirements 323, extended requirements 324, functions 325 and sub-functions 326 may be arranged hierarchically according to various schemes. As shown, the basic requirements 323, extended requirements 324, functions 325 and sub-functions 326 are arranged in levels. Text labels 1002, 1004, 1006 and 1008 may be used to identify the level or other arrangement of the basic requirements 323, extended requirements 324, functions 325 and sub-functions 326. As shown, the text labels refer to basic requirements 1002, extended requirements 1004, functions 1006 and sub-functions 1008. The sub-functions 326 may be augmented with one or more rectangles having icons and/or text 1010 included therein. The text 1010 may be abbreviations for physical and other effects of the functions 325 or sub-functions 326. Physical and other effects include, thermodynamic effects, acoustic effects, weight/mass requirements, mechanical properties, for example, heat produced, sound produced, gas emissions, water emissions, fuel consumed, waster consumed, energy produced, energy consumed, electricity required, electricity produced, particulate produced, and others.

Figure 11:
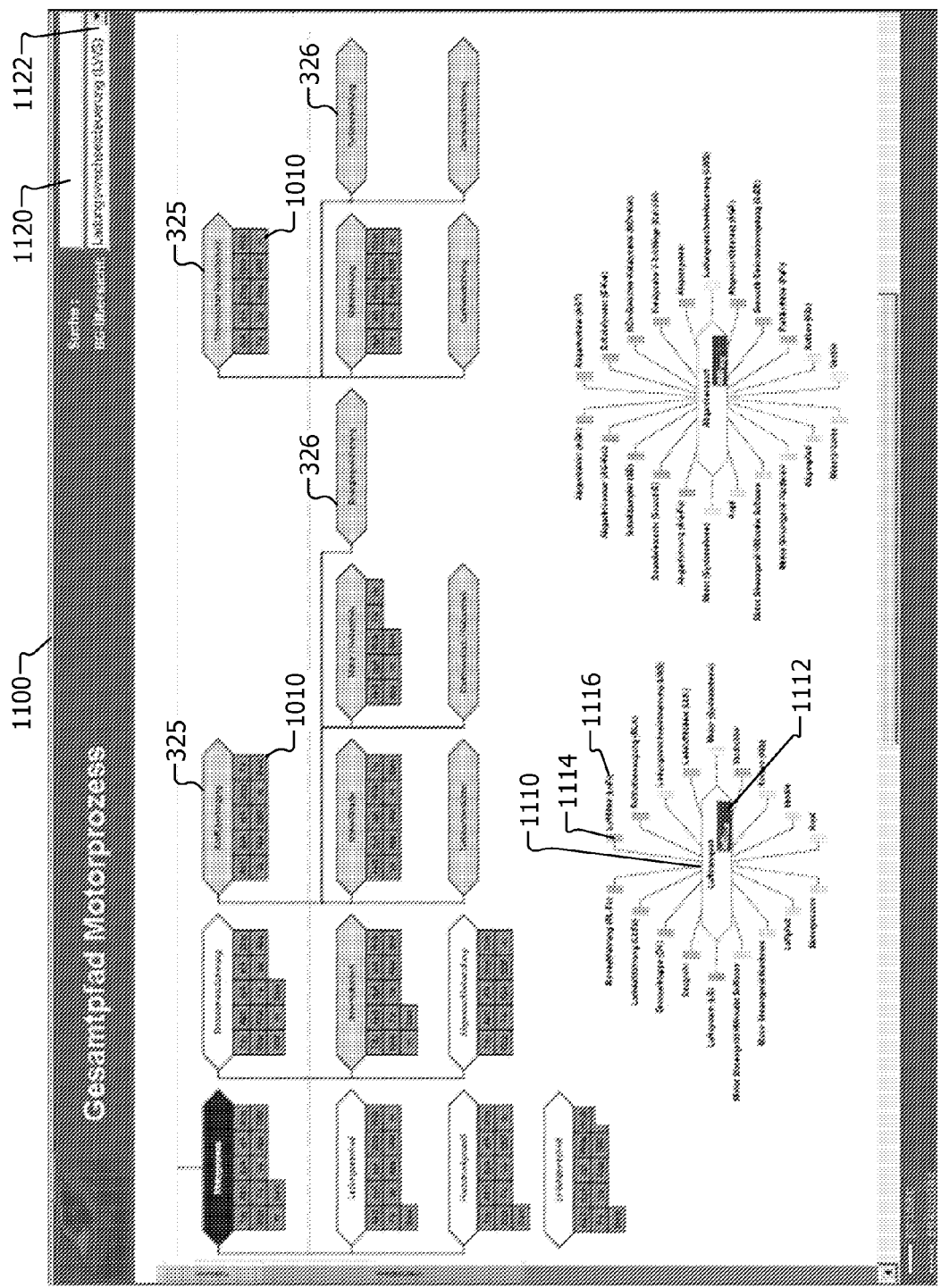
FIG. 11 is a screen shot showing the path of a selected function provided by a product design, development and production system according to the methods described herein.

FIG. 11 is a screen shot showing the path of a selected function with related functions, sub-functions 326 and base functions 1110 provided by a product design, development and production system according to the methods described herein. The window 1100 may be provided by PDP software 218 in a browser 224 or through a PDP client 226. The base functions may be arranged in a hub and spoke arrangement, with the hub including information about the base function 1110 and each of the spokes leading to systems and subsystems 1116 associated with the base function 1110. The relationship between the base function 1110 and the particular systems and subsystems 1116 may be seen by the lines connecting the systems and subsystems 1116 to the base function 1110. In one embodiment, solid lines are used to represent a primary relationship while dashed lines are used to represent a secondary relationship. In other embodiments, other kinds of lines and colored lines may be used to communicate this same information.

A graphical element or icon such as a color coded rectangle 1114 may be provided with the text listing of the systems and subsystems 1116 surrounding the function to readily identify and make accessible information about the relationship between the function and the systems or subsystems. The color coding of rectangle 1114 may be based on the system or subsystem in which it is included to readily identify the relationship between the function and the particular systems and subsystems. A user may select, click on or otherwise activate rectangle 1114 to access the process chain 610 for the particular system or subsystem 1116. A user may select, click on or otherwise activate subsystem text 1116 to invert the hub and spoke representation such that the unit is displayed as the hub (center) and is surrounded by functions.

In addition, a color coded rectangle 1112 may be included in the function to represent the characteristic value of the base function. The color coded rectangle 1112 may be selected, clicked on or otherwise activated to obtain additional information about the characteristic value of the particular function. Another version of the base functions may be similarly displayed to show related variables and parameters. A user may select which view of the base functions, if any, should be displayed along with functions and sub-functions. The particular view of the base functions may be selected from a pull-down menu associated with the window 1100.

The window 1100 may include text entry fields, menus and other user interface elements which allow a user to search for a particular component, unit, part, subsystem, etc. For example, text entry field 1120 allows a user to specify a particular component, unit, part, subsystem, etc., while menu 1122 allows a user to specify which system, units or components should be searched. In this way, the PDP system allows a user to easily locate information about a particular component, unit, part, subsystem, etc. In addition, detailed information about the relationships of the various systems, subsystems, components and functions may be accessible via text entry field 1120 and menu 1122 or similar user interface. This search and information interface may be provided in some or all of the windows provided by the PDP system, or may be made available via a pull-down menu or series of key-strokes from a keyboard.

FIG. 12 is a screen shot showing a fish bone representation of the main systems 332, subsystems 334 and units provided by a product design, development and production system according to the methods described herein. The fish bone representation may be provided by PDP software 218 in a window through a browser 224, a PDP client 226, or other program. Each of the subsystems 332 may be shown. When a system 332 is selected, clicked on or otherwise activated, a listing of subsystems 334 may be provided by the PDP software. The listing of subsystems may be stacked vertically in alphabetical order, as shown, may be presented in a list according to relatedness, presented in a list based on target completion date, presented in a list based on cost of development or manufacture, or other listing. When a subsystem 334 is selected, clicked on or otherwise activated, related or constituent units 336 may be presented. The units 336 may be provided next to or otherwise adjacent to the subsystem 334 to which they are related. Similarly, when a unit 336 is selected, clicked on or otherwise activated, related or constituent subunits 338 may be presented. The subunits 338 may be provided next to or otherwise adjacent to the unit 336 to which they are related. Color coding may also be used to distinguish related subsystems, units and subunits.

Initial View and Input

Figure 13:
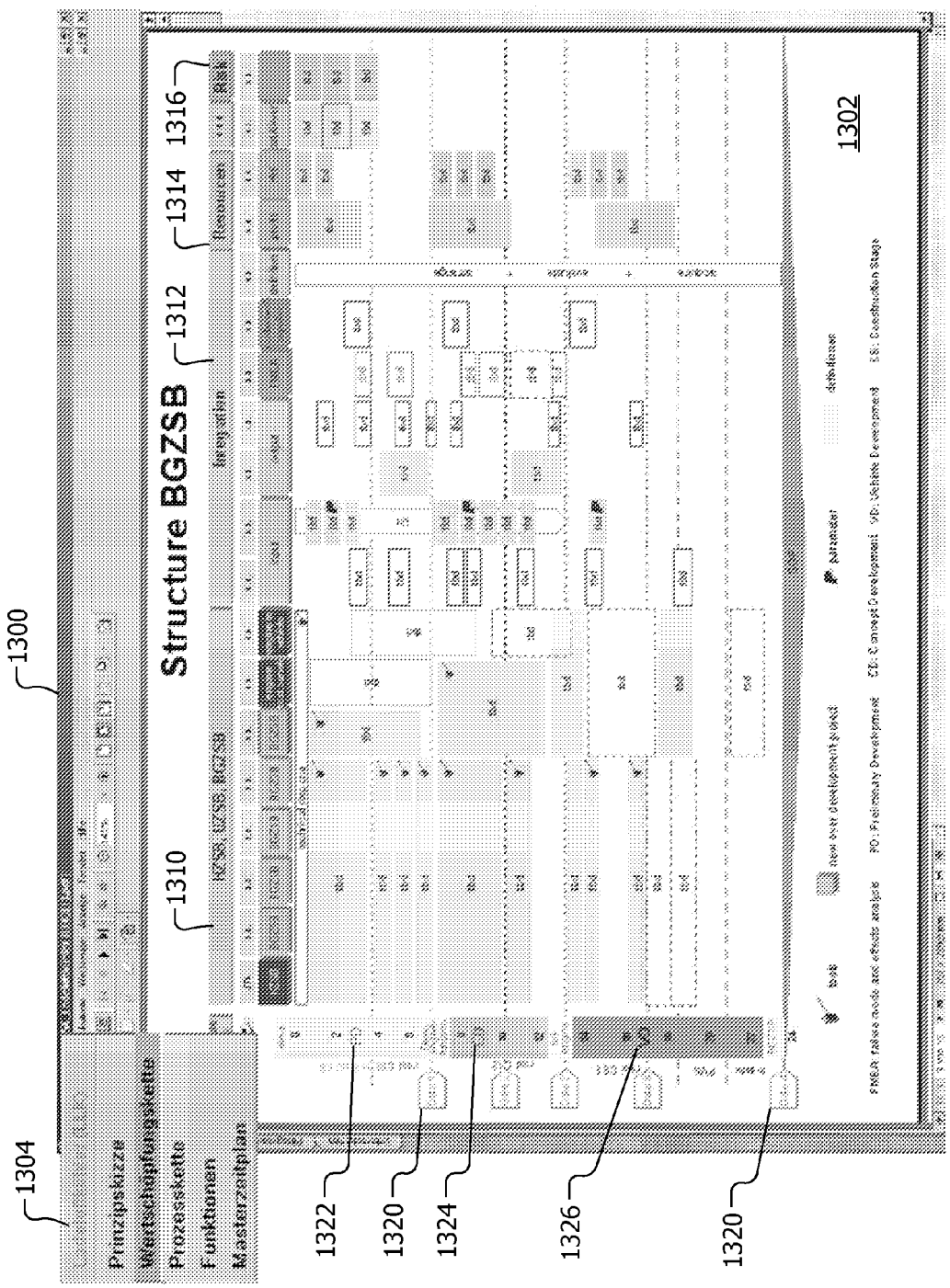
FIG. 13 is a screen shot showing an initial view and input screen.

Before the three axes and the relational interfaces may be displayed as shown in FIG. 3 and discussed above, initial selection of systems, subsystems, units, components, and specifications and requirements thereof, to the extent known, may be included or otherwise provided in an initial view and input screen 1302 shown in the screen shot 1300 of FIG. 13. Information may be entered by hand and/or pulled in from one or more databases. Information may also be imported from other computer programs. A user may create the initial strategy for design, development and/or production of a product with the initial view and input screen 1302 provided by PDP software via an Internet browser 224, a PDP client 226, or other program. The initial view and input screen 1302 allows for the initial creation of the knowledge structure underlying the PDP system. FIG. 13 is a screen shot 1300 showing the initial view and input screen 1302. The initial view and input screen 1302 may provide a single graphical view of many pertinent pieces used to describe the design, development and/or production of a product or portion thereof. The initial view and input screen 1302 may be accessible via a pull down menu 1304. The initial view and input screen 1302 may allow a user or team of users to provide the fundamental building blocks and basic information for the design, development and/or production of a product or portion thereof. The initial view and input screen 1302 may be referred to as an initial strategy screen. Some of the information obtained in the initial strategy screen may be used by the PDP system to create or generate the process chains and other constructs described herein.

The initial view and input screen 1302 may include text and graphics that provide columns representing the main systems, subsystems and 1310; integration requirements 1312 such as inputs, outputs, sources of components, failure mode effects and analysis, definitions of components, units and subsystems; resources 1314; and risks 1316. The risks may be special concerns that may be addressed, such as anticipated or known integration issues, cost issues, manufacturing difficulties, shortages, and others. The initial view and input screen 1302 may include text and graphics showing a horizontal time scale. The time scale (shown as the left-most column) may include gates 1320 and actions, milestones or stages achieved over a period of time. The time may be in days, weeks, months, and/or may be numbered stages. Stages, milestones, and maturity such as preliminary development 1322, concept 1324, product (for example, vehicle) development 1326, and construction (prototyping) may be shown by text and/or graphics. Color may be used to help distinguish pertinent and/or related systems, components, time frames, and other information.

Consolidated Views

The PDP system and methods may allow for the creation of various output that may be used to readily view various portions of the functions, process chains, gates, stages of development, variables, data and other information pertinent to product design, development and/or production. These outputs may be created by accessing pull down menus, activating control buttons, and by other user interface techniques. The output may be stored as a file on a computer readable medium such as a hard disk, printed on paper, and/or displayed on a screen. These outputs may be referred to as consolidated views.

Figure 14:
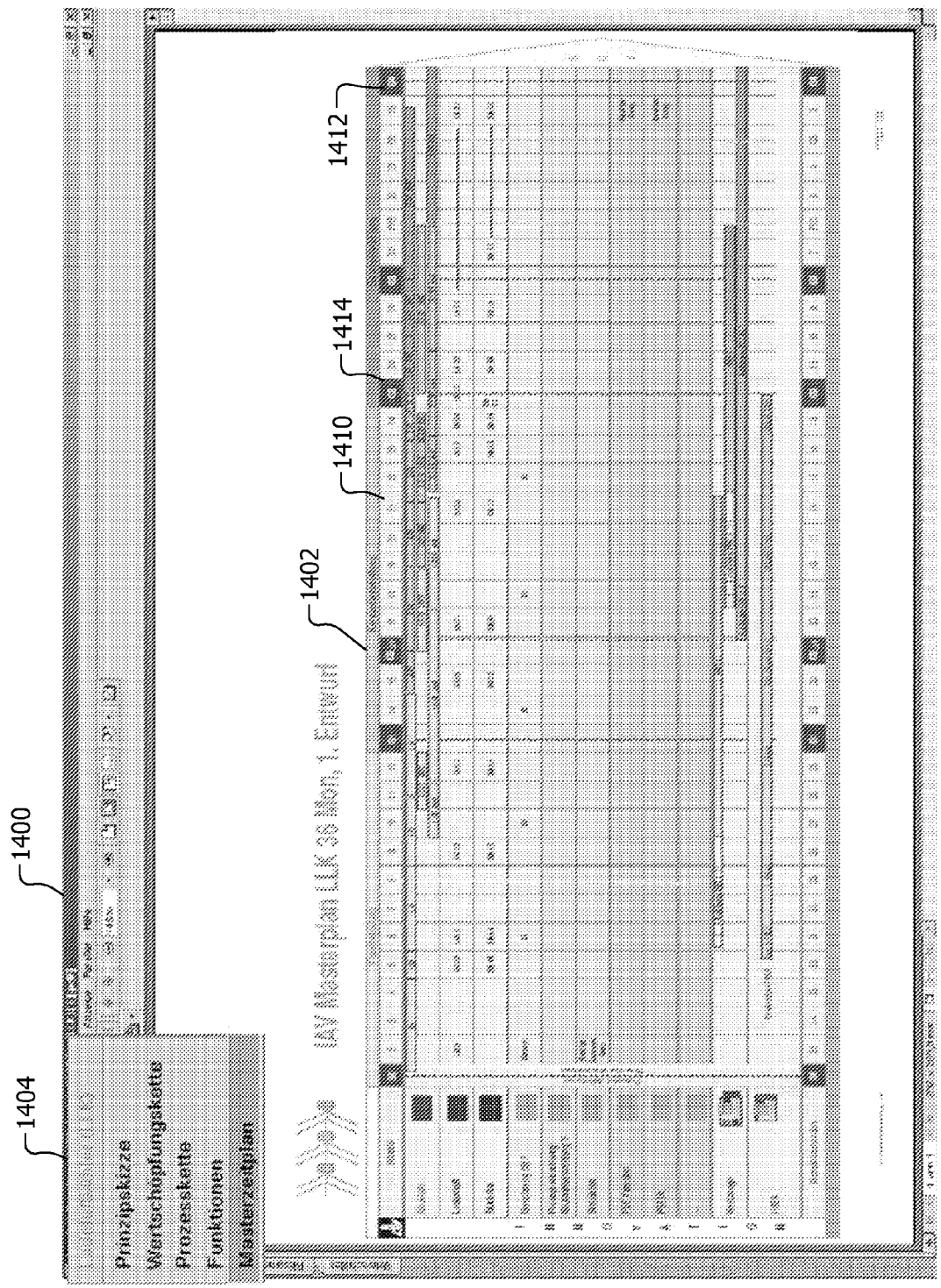
FIG. 14 is a screen shot showing a master plan produced by a product design, development and production system according to the methods described herein.

One example of a consolidated view is shown in FIG. 14. FIG. 14 is a screen shot of a window 1400 showing a master plan 1402 produced by a product design, development and production system according to the methods described herein. The master plan 1402 provides a single graphical view of many pertinent pieces describing the design and development of a product. The master plan 1402 may be accessible via a pull down menu 1404. The master plan 1402 may include text and graphics that provide columns representing time 1410. As shown, the time may be in days, weeks, months, and/or may be numbered stages. Pertinent milestones may be shown as gates 1412 and 1414 and/or by other text or graphics that may specifically recite the milestone achieved, such as, for example, component x complete using "complete(x)" and component y in prototype using "prototype (y)". Other labeling, graphics and constructs may be used to show milestones and/or gates. The rows in the master plan 1402 may represent various systems, subsystems, functions, processes, and other pertinent information about a product and/or product development. Color may be used to help distinguish pertinent and/or related systems, components, time frames, and other information.

Referring now to FIG. 15, FIG. 15 is a screen shot of a window 1500 showing the gates 1510 provided by a product design, development and production system according to the methods described herein. The gates 1510, like the gates 314 and 1414 (all of which refer to the same or similar construct), may represent milestones or achievements made during the staged design and or development of a product. The milestones or achievements may be shown over time designated by days, weeks, stages 1520, and others. Text and/or graphics may be used to show particular systems 1540, components, etc. that are the subject of a particular stage, that is, at a particular time. Target labels 1550 may be shown as corresponding to a particular time and/or to a system or milestone listed in the time line. The target labels 1550 may be text that describes goals or targets of completion or achievement during a particular time frame or stage. The targets may include emissions goals, quality control, component completion, subsystem completion, and others. Clicking on, selecting or otherwise activating a target label 1550 may cause the PDP system to present additional information about the selected target in a new window or in the existing window.

Referring now to FIG. 16, FIG. 16 is a screen shot of a window showing a first example of technical controlling information 1600 provided by a product design, development and production system according to the methods described herein. The technical controlling information 1600 may be generated by the PDP system and methods described herein. The technical controlling information 1600 may include all of the information provided in the three axes 310, 320 and 330, the information in relational interfaces circle 340, as well as the information provided in the PDP table 400, which are shown in FIGS. 4 and 5 and described above.

The technical controlling information 1600 may have three sections, technical units/activities 1610, integration 1620 and prototype and tools planning 1630. Each of the technical units/activities 1610, integration 1620 and prototype and tools planning 1630 sections may be displayed independently as separate tables/documents. The leftmost column of the technical controlling information 1600 may designate a numerical reference 1640 or other identifier that signify the stages of development of a product. Selecting, clicking on or otherwise activating any of the graphical representations and/ or text in the technical controlling information 1600 may allow a user to obtain more detailed information from the PDP system about the selected element or item, and may bring the user to another screen or window providing additional information. In one embodiment, the technical controlling information 1600 is editable so that a user may select, click on or otherwise activate an entry in the technical controlling information 1600 to modify the particular entry. In one embodiment, a user may edit technical controlling information for a particular system, subsystem or component by making a selection from a pull-down menu, not shown.

Figure 17:
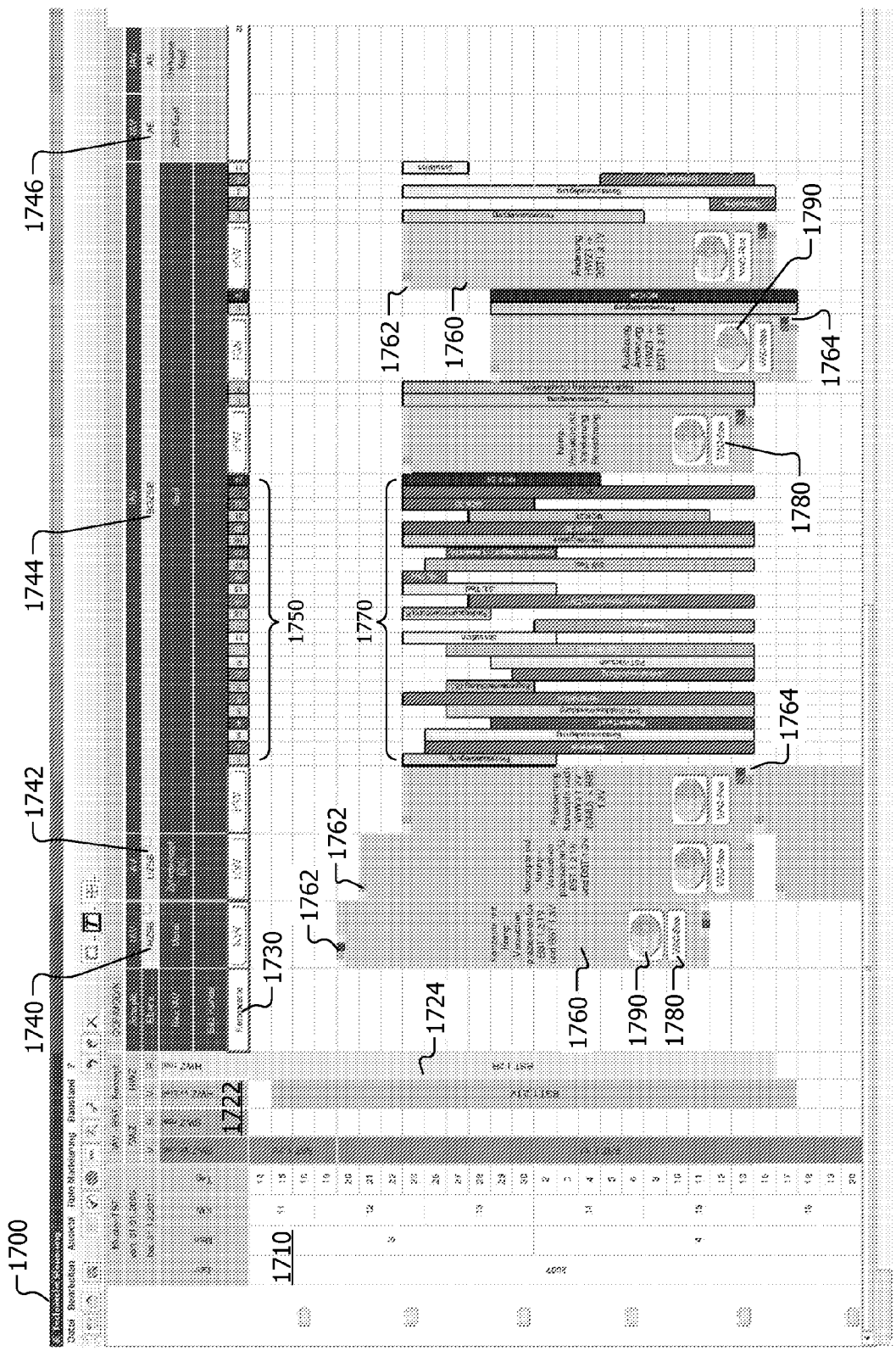
FIG. 17 is a screen shot showing a second example of technical controlling information provided by a product design, development and production system according to the methods described herein.

FIG. 17 is a screen shot 1700 showing a second example of technical controlling information provided by a product design, development and production system according to the methods described herein. The second example of controlling information shown in FIG. 17 may be provided in response to a user selection of a command or link associated with the screen shot of the technical controlling information 1600 displaying the first example of technical controlling information. In one embodiment, the second example of controlling information shown in FIG. 17 is provided in place of the first example of technical controlling information shown in screen shot 1600.

The second example of controlling information 1700 shown in FIG. 17 may include all of the information provided in the three axes 310, 320 and 330, the information in relational interfaces circle 340, as well as the information provided in the PDP table 400, which are shown in FIGS. 4 and 5 and described above. The controlling information 1700 may include time designations 1710 such as months, weeks and days. In one embodiment of controlling information 1700, the time designations 1710 are presented on the left side of the graphical representation, chart or table. The controlling information 1700 may include a maturity level designation 1722 such as representations of the staged development of a product 1724. The numbers in the representations of the staged development of a product 1724 may refer to the various stages described above regarding FIGS. 6, 7 and 9. The controlling information 1700 may include headings for systems 1740, subsystems 1742, units 1744, and components 1746 or subunits of a product.

Representations of the particular systems, subsystems, units and components or subunits of a product may be shown by element 1760. The representations 1760 of the systems, subsystems, units and components or subunits may have interface links 1762 to input interfaces 702 and interface links 1764 to output interfaces 704. The representations 1760 of the systems, subsystems, units and components or subunits may include references to development stages in numerical form, may have a graphical resource link 1780 to needed resources and may have a graphical relational interfaces link 1790 to the relational interfaces 340. The clicking on the resource link 1780 provides a list of resources needed to design, develop and/or produce the particular system, subsystem, etc., such as, for example, personnel needed, equipment needed, testing needed, test bench, machining, and physical resources needed such as oil, gas, fluid, water, electricity, and others. Header 1750 may reference working process chains which are shown in more detail as systematized working process modules 1770. Selecting, clicking on or otherwise activating any of the graphical representations and/or text in controlling information 1700 may allow a user to obtain more detailed information from the PDP system about the selected element or item, and may bring the user to another screen or window providing additional information.

The PDP system and software may also provide other output charts and diagrams such as time-lines, cost calculation tables, materials analyses by component or other grouping, physical analyses by component or other grouping, and others.

Closing Comments

The foregoing is merely illustrative and not limiting, having been presented by way of example only. Although examples have been shown and described, it will be apparent to those having ordinary skill in the art that changes, modifications, and/or alterations may be made.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, that is, to mean including but not limited to. Only the transitional phrases "consisting of" and "consisting essentially of" are, respectively, closed or semi-closed transitional phrases with respect to claims.

Use of ordinal terms such as "first", "second", "third", etc., in the written description does not by itself connote any priority, precedence, or order but are used merely as labels to distinguish among two or more of a feature, element, item, etc. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

The invention claimed is:

1. A method for displaying information about a product during creation, design, development and/or production, the method performed by a server computing device having specialized software stored thereon, the specialized software when executed by the server computing device causing the server computing device to perform the method, the method comprising:

the server computing device providing instructions to a client computing device over a network, the instructions causing the client computing device to present a three axis representation of the product on a display coupled with the client computing device the three axis representation including
a first axis comprising a representation of a process chain for the product,
a second axis comprising a representation of a product structure for the product, and
a third axis comprising a representation of functional elements of the product;
wherein the three axis representation is augmented on the display with an underlying circle representing relational interfaces that include relationship information about the product structure and the functional elements.

2. The method of claim 1 wherein the representation of a process chain includes interface processes, working processes, and gates.

3. The method of claim 2 wherein the gates indicate a staged development process.

4. The method of claim 1 wherein the representation of the product structure includes systems and subsystems.

5. The method of claim 4 wherein the representation of the product structure further includes units and subunits.

6. The method of claim 1 wherein the representation of the product structure is in a fish bone format.

7. The method of claim 1 wherein the representation of functional elements of the product includes functions, sub-functions and base functions.

8. The method of claim 7 wherein the representation of functional elements of the product further includes requirements and extended requirements.

9. The method of claim 1 wherein the process chain, the product structure and the functional elements are interrelated.

10. The method of claim 1 further comprising:
recognizing user activation of one of the three axes as a user activated axis;
providing information about the user activated axis.

11. The method of claim 10 wherein the providing information about the user activated axis comprises:
providing information about interface processes, working processes, and gates of the process chain when the user activated axis is the first axis;
providing information about systems, subsystems, units and subunits of the product structure when the user activated axis is the second axis; and
providing information about functions, sub-functions and base functions of the functional elements when the user activated axis is the third axis.

12. The method of claim 1 further comprising:
providing an initial strategy input screen to a user;
receiving process chain information from the user via the initial strategy input screen;
receiving product structure information from the user via the initial strategy input screen; and
receiving functional element information from the user via the initial strategy input screen.

13. The method of claim 1 further comprising:
generating a technical controlling instrument based on the process chain, the product structure, and the functional elements;
providing the technical controlling instrument to a user.

14. The method of claim 1 wherein the relational interfaces include at least one from the group comprising physical properties, chemical properties, thermal properties, thermodynamic properties, acoustic properties, electrical properties of the product structure and corresponding functional elements.

15. The method of claim 1 further comprising:
generating a technical controlling instrument based on the process chain, the product structure, the functional elements, and the relational interfaces;
providing the technical controlling instrument to a user.

16. A storage medium having instructions stored thereon which when executed by a processor cause the processor to perform actions comprising:
providing a three axis representation of a product including
a first axis comprising a representation of a process chain for the product,
a second axis comprising a representation of a product structure for the product, and
a third axis comprising a representation of functional elements of the product;
wherein the three axis representation is augmented with an underlying circle representing relational interfaces that include relationship information about the product structure and the functional elements.

17. The storage medium of claim 16 wherein the representation of a process chain includes interface processes, working processes, and gates.

18. The storage medium of claim 17 wherein the gates indicate a staged development process.

19. The storage medium of claim 18 wherein the representation of the product structure includes systems and subsystems.

20. The storage medium of claim 19 wherein the representation of the product structure further includes units and subunits.

21. The storage medium of claim 16 wherein the representation of the product structure is in a fish bone format.

22. The storage medium of claim 16 wherein the representation of functional elements of the product includes functions, sub-functions and base functions.

23. The storage medium of claim 22 wherein the representation of functional elements of the product further includes requirements and extended requirements.

24. The storage medium of claim 16 wherein the process chain, the product structure and the functional elements are interrelated.

25. The storage medium of claim 16 having further instructions stored thereon which when executed cause the processor to perform further actions comprising:
recognizing user activation of one of the three axes as a user activated axis;
providing information about the user activated axis.

26. The storage medium of claim 25 wherein the providing information about the user activated axis comprises:
providing information about interface processes, working processes, and gates of the process chain when the user activated axis is the first axis;
providing information about systems, subsystems, units and subunits of the product structure when the user activated axis is the second axis; and
providing information about functions, sub-functions and base functions of the functional elements when the user activated axis is the third axis.

27. The storage medium of claim 16 having further instructions stored thereon which when executed cause the processor to perform further actions comprising:
providing an initial strategy input screen to a user;
receiving process chain information from the user via the initial strategy input screen;
receiving product structure information from the user via the initial strategy input screen; and
receiving functional element information from the user via the initial strategy input screen.

28. The storage medium of claim 16 having further instructions stored thereon which when executed cause the processor to perform further actions comprising:
generating a technical controlling instrument based on the process chain, the product structure, and the functional elements;
providing the technical controlling instrument to a user.

29. The storage medium of claim 16 wherein the relational interfaces include at least one from the group comprising physical properties, chemical properties, thermal properties, thermodynamic properties, acoustic properties, electrical properties of the product structure and corresponding functional elements.

30. The storage medium of claim 16 having further instructions stored thereon which when executed cause the processor to perform further actions comprising:
generating a technical controlling instrument based on the process chain, the product structure, the functional elements, and the relational interfaces;
providing the technical controlling instrument to a user.

31. A server for displaying information about a product during creation, design, development and/or production, the server including a processor, a memory, a network access device, and a storage medium, the storage medium having a software application stored thereon, the software application to communicate with a client computer over a network, the software application to perform actions comprising:

provinding to a user over the network a three axis representation of the product including
- a first axis comprising a representation of a process chain for the product,
- a second axis comprising a representation of a product structure for the product, and
- a third axis comprising a representation of functional elements of the product;

wherein the three axis representation is augmented with an underlying circle representing relational interfaces that include relationship information about the product structure and the functional elements.

32. The server of claim 31 wherein the representation of a process chain includes interface processes, working processes, and gates.

33. The server of claim 32 wherein the gates indicate a staged development process.

34. The server of claim 31 wherein the representation of the product structure includes systems and subsystems.

35. The server of claim 34 wherein the representation of the product structure further includes units and subunits.

36. The server of claim 31 wherein the representation of the product structure is in a fish bone format.

37. The server of claim 31 wherein the representation of functional elements of the product includes functions, sub-functions and base functions.

38. The server of claim 37 wherein the representation of functional elements of the product further includes requirements and extended requirements.

39. The server of claim 31 wherein the process chain, the product structure and the functional elements are interrelated.

40. The server of claim 31 wherein the software application is configured to perform further actions comprising:
   recognizing user activation of one of the three axes as a user activated axis;
   providing information about the user activated axis.

41. The server of claim 40 wherein the providing information about the user activated axis comprises:
   providing information about interface processes, working processes, and gates of the process chain when the user activated axis is the first axis;
   providing information about systems, subsystems, units and subunits of the product structure when the user activated axis is the second axis; and
   providing information about functions, sub-functions and base functions of the functional elements when the user activated axis is the third axis.

42. The server of claim 31 wherein the software application is configured to perform further actions comprising:
   providing an initial strategy input screen to the user;
   receiving over the network process chain information from the user via the initial strategy input screen;
   receiving over the network product structure information from the user via the initial strategy input screen; and
   receiving over the network functional element information from the user via the initial strategy input screen.

43. The server of claim 31 wherein the software application is configured to perform further actions comprising:
   generating a technical controlling instrument based on the process chain, the product structure, and the functional elements;
   providing the technical controlling instrument to the user over the network.

44. The server of claim 31 wherein the relational interfaces include at least one from the group comprising physical properties, chemical properties, thermal properties, thermodynamic properties, acoustic properties, electrical properties of the product structure and corresponding functional elements.

45. The server of claim 31 wherein the software application is configured to perform further actions comprising:
   generating a technical controlling instrument based on the process chain, the product structure, the functional elements, and the relational interfaces;
   providing the technical controlling instrument to the user over the network.

\* \* \* \* \*

UNITED STATES PATENT AND TRADEMARK OFFICE
CERTIFICATE OF CORRECTION

PATENT NO. : 7,584,078 B2
APPLICATION NO. : 11/463561
DATED : September 1, 2009
INVENTOR(S) : Junghans et al.

It is certified that error appears in the above-identified patent and that said Letters Patent is hereby corrected as shown below:

On the Title page, Item (73) replace "Assignee: IAV GmbH Ingenieurgesellschaft Auto und Verker" with --Assignee: IAV GmbH Ingenieurgesellschaft Auto und Verkehr--

Signed and Sealed this

Third Day of November, 2009

David J. Kappos
*Director of the United States Patent and Trademark Office*